United States Patent
Shimazawa et al.

(10) Patent No.: US 7,924,658 B2
(45) Date of Patent: *Apr. 12, 2011

(54) HEAT-ASSISTED MAGNETIC RECORDING HEAD CONSTITUTED OF SLIDER AND LIGHT SOURCE UNIT, AND MANUFACTURING METHOD OF THE HEAD

(75) Inventors: Koji Shimazawa, Tokyo (JP); Yasuhiro Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 360 days.

This patent is subject to a terminal disclaimer.

(21) Appl. No.: 12/246,216

(22) Filed: Oct. 6, 2008

(65) Prior Publication Data

US 2010/0085846 A1    Apr. 8, 2010

(51) Int. Cl.
*G11B 11/00*    (2006.01)
(52) U.S. Cl. ................... 369/13.14; 369/13.33
(58) Field of Classification Search ............... 369/13.33, 369/13.14, 13.35, 13.13; 360/59, 125.33, 360/245.3, 10, 126
See application file for complete search history.

(56) References Cited

U.S. PATENT DOCUMENTS

| | | | |
|---|---|---|---|
| 6,768,556 B1 | 7/2004 | Matsumoto et al. | |
| 2004/0081031 A1 | 4/2004 | Saga et al. | |
| 2006/0187564 A1* | 8/2006 | Sato et al. | 360/59 |
| 2007/0177302 A1* | 8/2007 | Shimazawa et al. | 360/126 |
| 2008/0043360 A1 | 2/2008 | Shimazawa et al. | |
| 2009/0262448 A1* | 10/2009 | Shimazawa et al. | 360/59 |
| 2009/0266789 A1* | 10/2009 | Shimazawa et al. | 216/22 |

FOREIGN PATENT DOCUMENTS

WO    WO 01/47076 A2    6/2001

OTHER PUBLICATIONS

Miyanishi et al. Near-Field Assisted Magnetic Recording; IEEE Transactions on Magnetics; Oct. 2005; pp. 2817-2821 vol. 41, No. 10.
Shimazawa et al.; U.S. Appl. No. 12/107,216, filed Apr. 22, 2008.
Shimazawa et. al; U.S. Appl. No. 12/108,234, filed Apr. 23, 2008.

* cited by examiner

*Primary Examiner* — Ali Neyzari
(74) *Attorney, Agent, or Firm* — Oliff & Berridge, PLC

(57) ABSTRACT

Provided is a method for manufacturing a heat-assisted magnetic recording head, capable of joining a light source unit and a slider with a sufficiently high alignment accuracy. In the method, the unit including a light source is joined to the slider including a head part. First, at least one marker provided on the head-part end surface is set so that the distance from the waveguide incident center to the marker end is substantially equal to the distance from the light-emission center of the light source to the end surface of the light source. After that, the unit and slider are relatively moved while keeping the unit in surface contact with the slider, and the relative positions are set so that the end of the marker coincides with, or is at a distance within an acceptable range from, the edge of the surface of the light source.

18 Claims, 13 Drawing Sheets

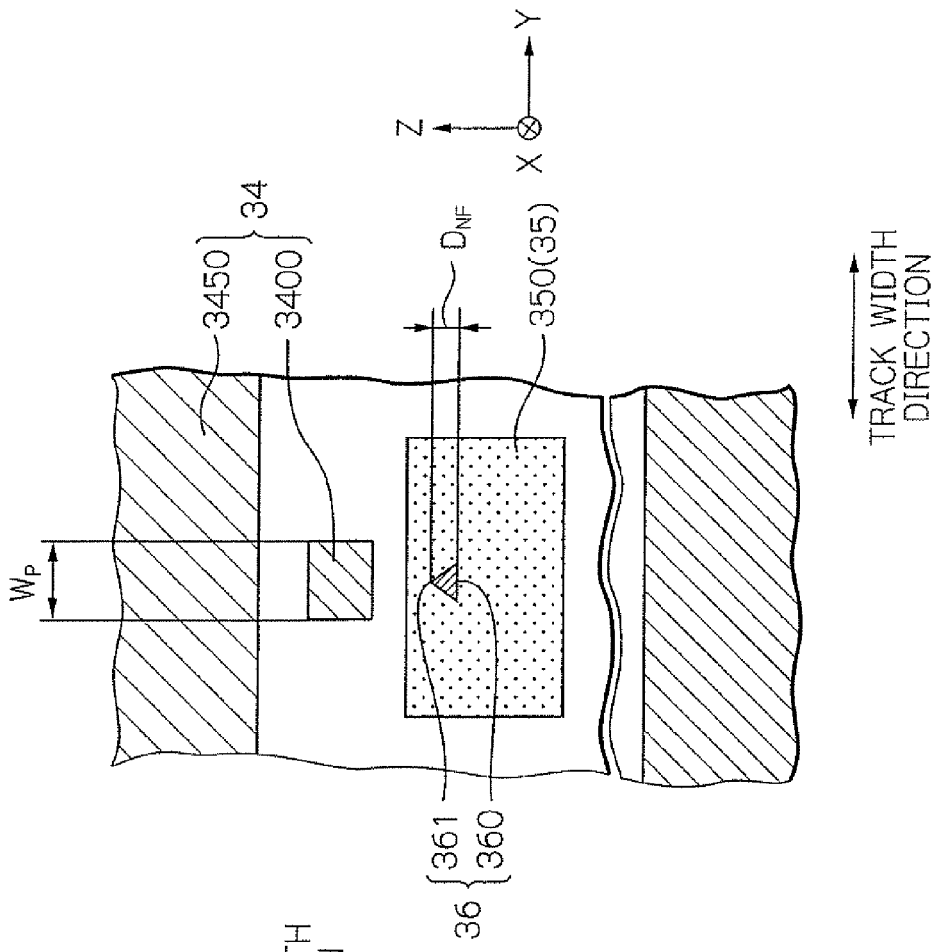
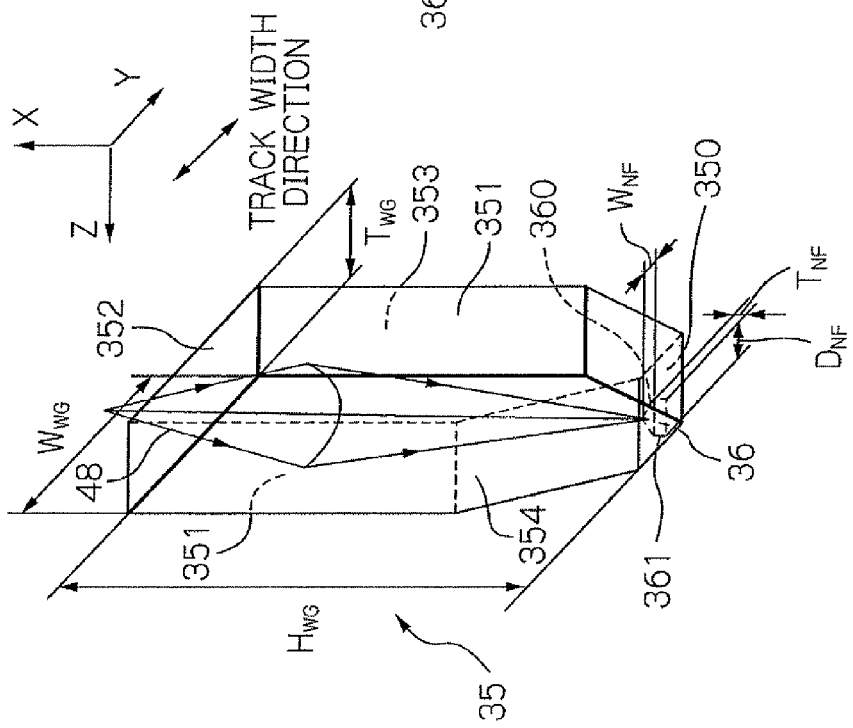

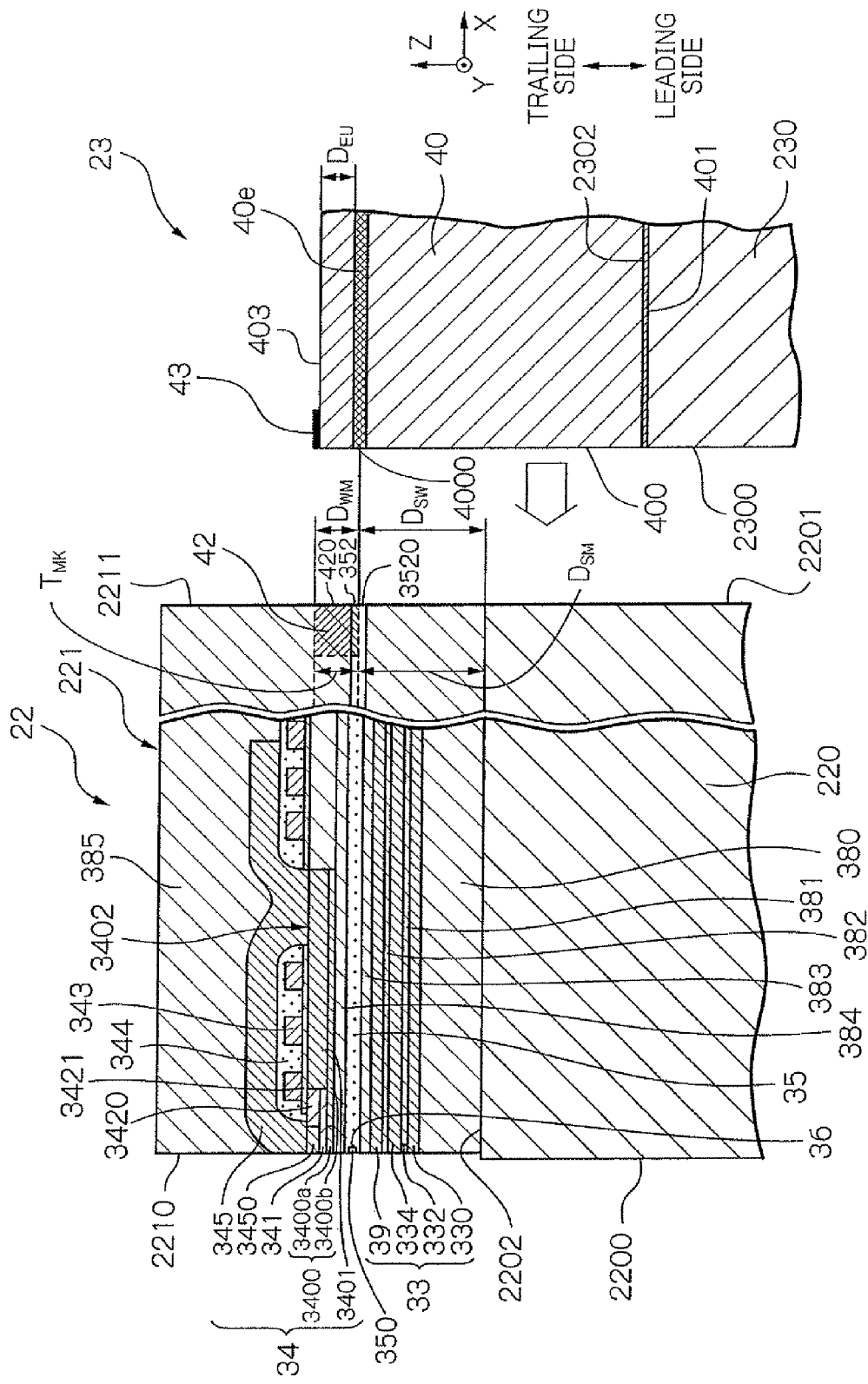

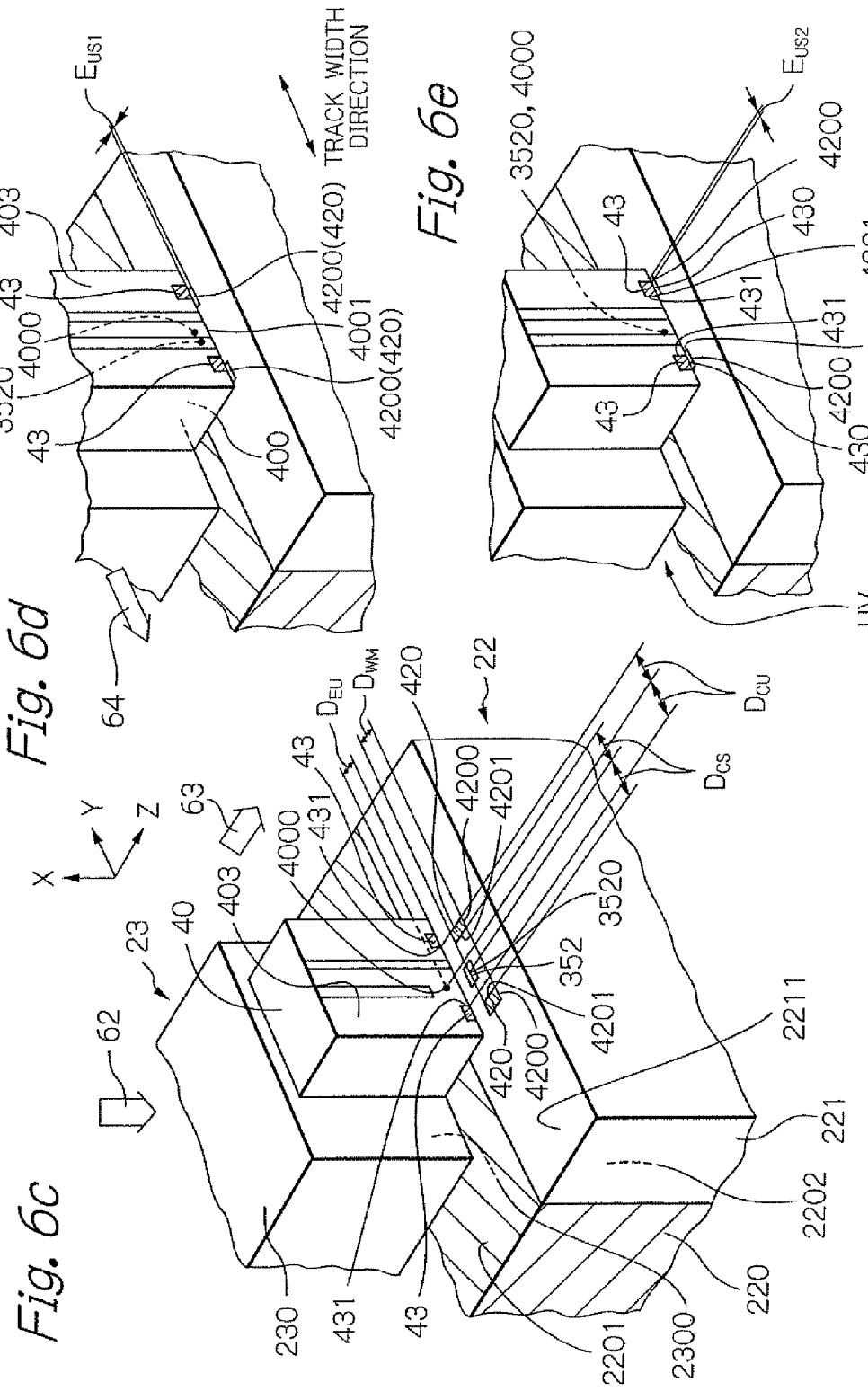
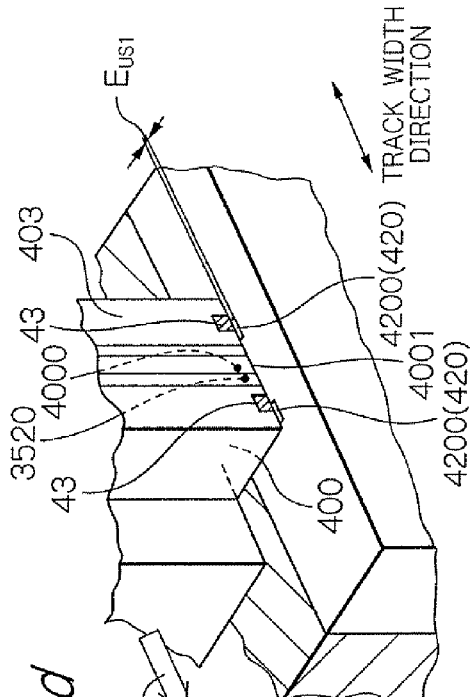

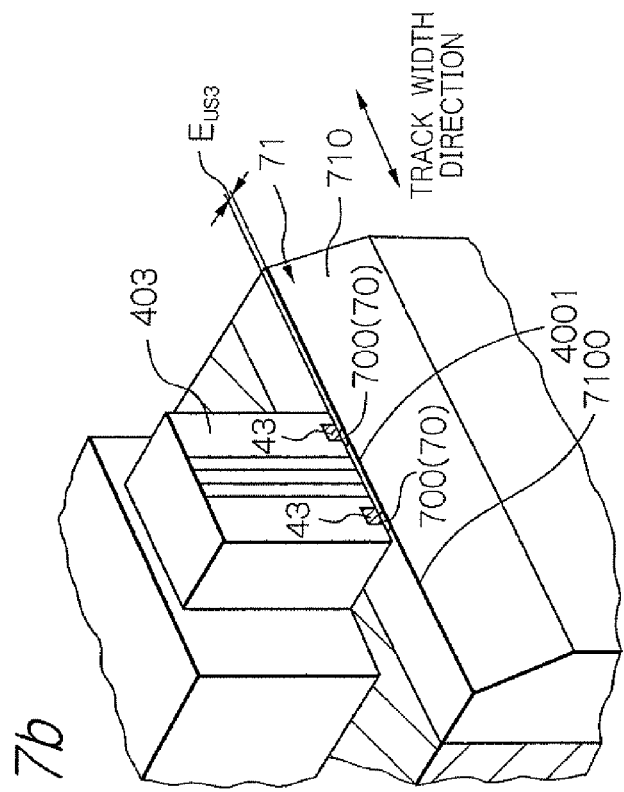
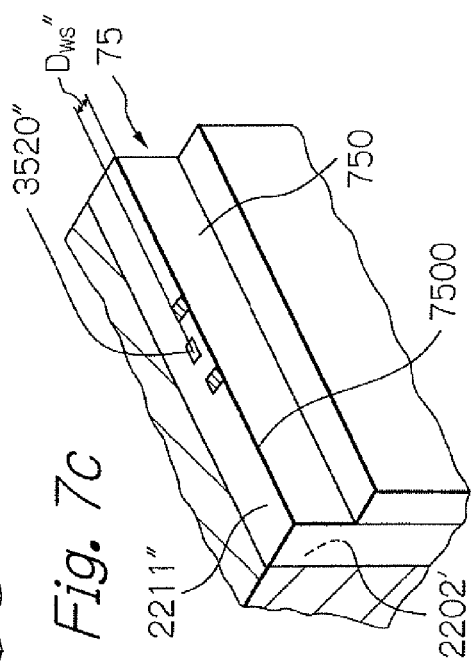
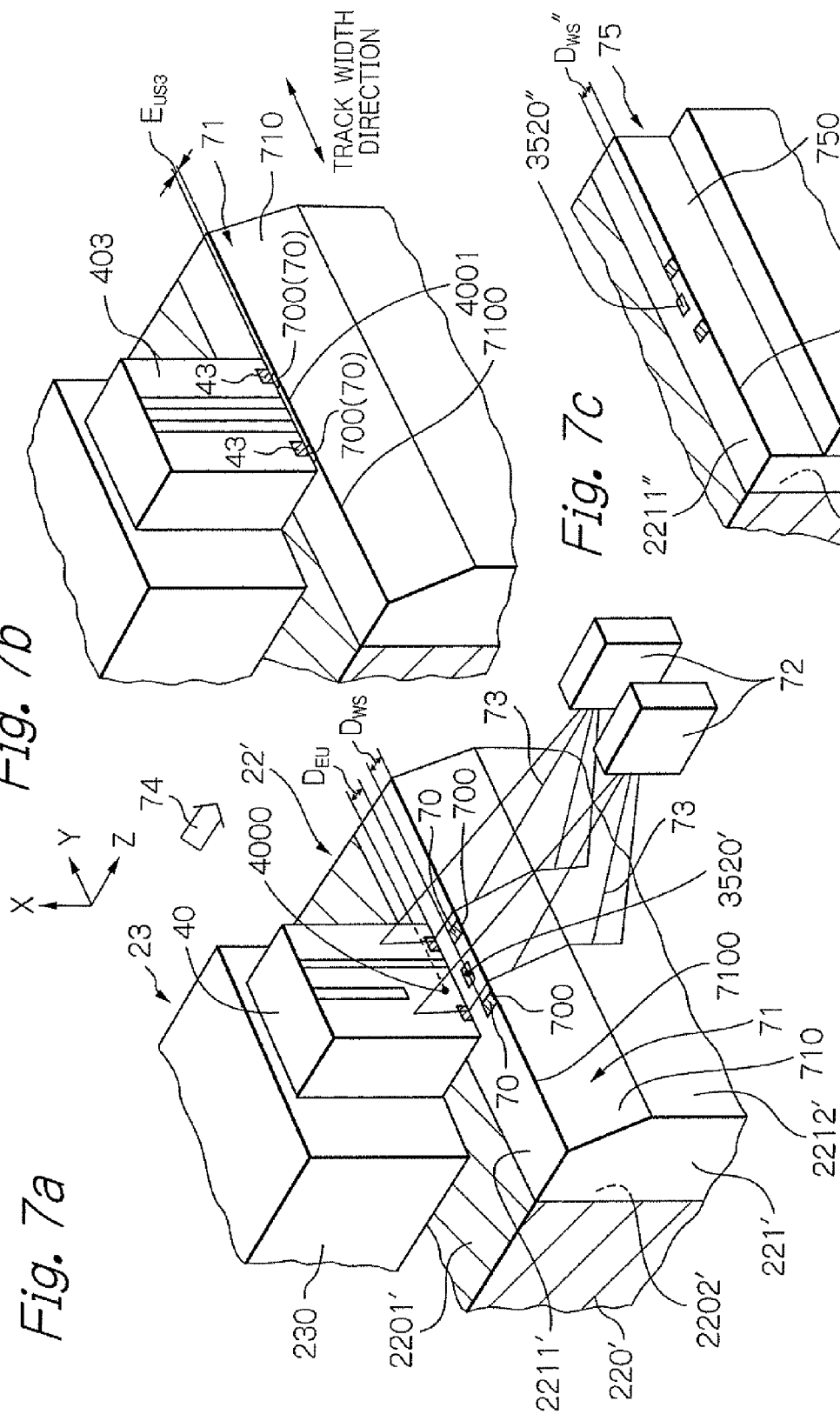

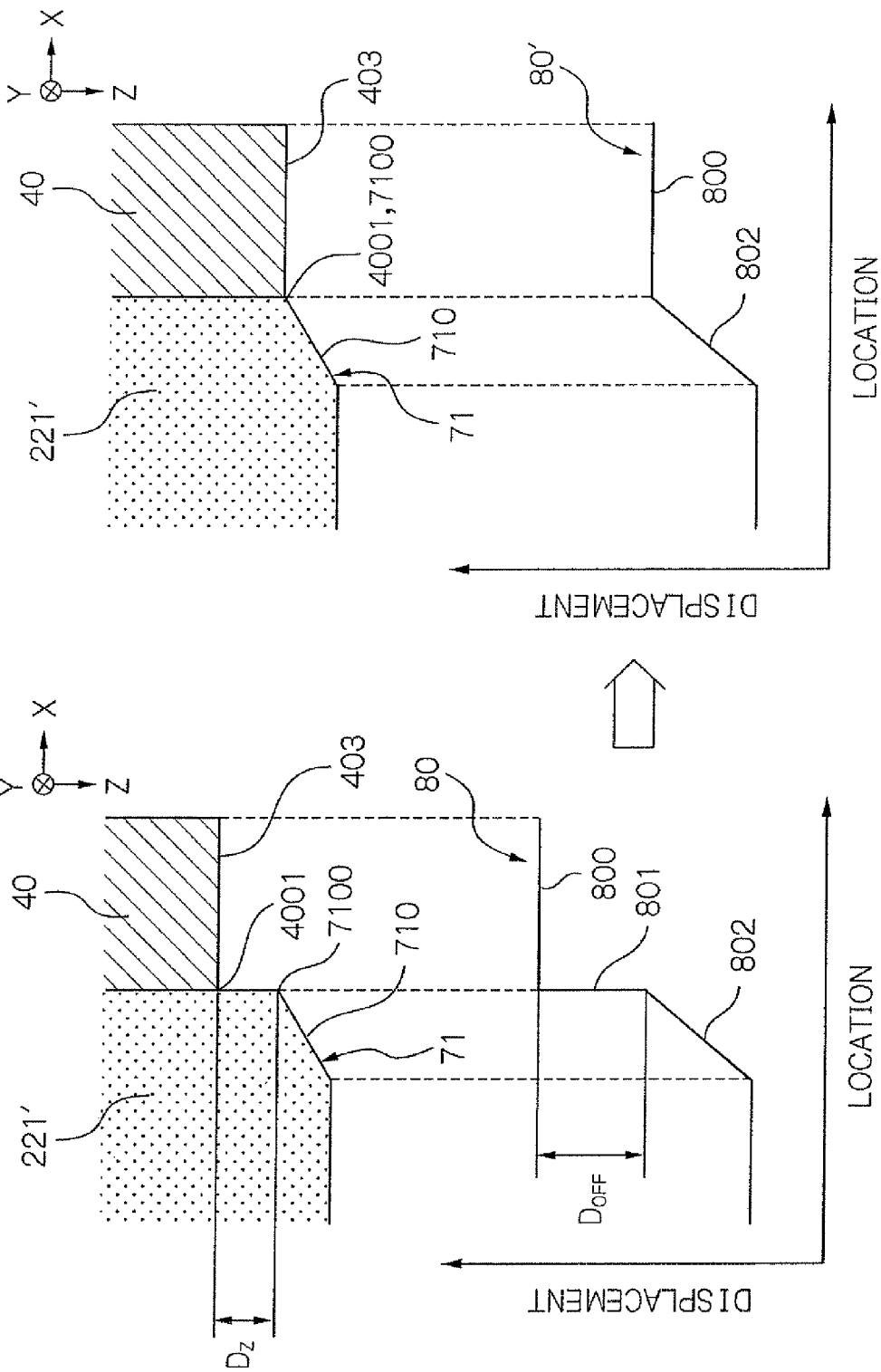

HEAT-ASSISTED MAGNETIC RECORDING HEAD CONSTITUTED OF SLIDER AND LIGHT SOURCE UNIT, AND MANUFACTURING METHOD OF THE HEAD

BACKGROUND OF THE INVENTION

1. Field of the Invention

The present invention relates to a magnetic head including a light source, for writing signals by using heat-assisted magnetic recording, and to a method for manufacturing the magnetic head.

2. Description of the Related Art

As the recording density of a magnetic recording and reproducing apparatus, represented by a magnetic disk apparatus, becomes higher, further improvement has been required in the performance of a thin-film magnetic head. As the thin-film magnetic head, a composite-type thin-film magnetic head is widely used, which has a stacked structure of a magnetoresistive (MR) element for reading data and an electromagnetic transducer for writing data.

A magnetic recording medium, on the other hand, generally is magnetically discontinuous, in which magnetic microparticles are gathered together. Usually, each of the magnetic microparticles has a single magnetic-domain structure, and in the medium, one record bit consists of a plurality of the magnetic microparticles. Therefore, for improving its recording density, irregularity in the boundary of the record bit is required to be reduced by decreasing the size (volume) of the magnetic microparticle. However, a problem is likely to occur that the decrease in size causes thermal stability of the magnetization of the record bit to be degraded.

As a measure against the thermal stability problem, it may be possible to increase the magnetic anisotropy energy $K_U$ of the magnetic microparticles. However, the increase in energy $K_U$ causes the increase in anisotropic magnetic field (coercive force) of the magnetic recording medium. Whereas, write field intensity of the thin-film magnetic head is limited by the amount of saturation magnetic flux density of the soft-magnetic pole material of which the magnetic core of the head is formed. Therefore, the head cannot write data to the magnetic recording medium when the coercive force of the medium exceeds the write field limit.

Currently, as a method for solving the thermal stability problem, heat-assisted magnetic recording technique is proposed, in which a magnetic head writes data to the magnetic recording medium formed of a material originally having large magnetic anisotropy energy $K_U$, by reducing the anisotropic magnetic field of the medium with heat supplied to the medium just before the write field is applied. As proposed heat-assisted magnetic recording techniques, U.S. Pat. No. 6,768,556 describes a near-field light probe for irradiating light to the recording medium, which has a metal scatterer with a strobilus shape formed on a substrate and a dielectric material film formed around the metal scatterer. And US Patent Publication No. 2004/081031 A1 describes a scatterer as a near-field light probe, which is formed in contact with the main magnetic pole of a single-pole-type head for perpendicular magnetic recording in such a way that the irradiated surface of the scatterer is perpendicular to the medium surface. Furthermore, Miyanishi et al. "Near-field Assisted Magnetic Recording" IEEE TRANSACTIONS ON MAGNETICS, Vol. 41, No. 10, p.2817-2821 (2005) describes a U-shaped near-field light probe formed on a quartz crystal slider.

As described above, various forms of heat-assisted magnetic recording techniques are proposed. However, the present inventors suggest a heat-assisted magnetic recording head constituted by joining a light source unit provided with a light source to the end surface (back surface) opposite to the opposed-to-medium surface of a slider provided with a write head element. For example, US Patent Publication No. 2008/043360 A1 discloses such a light source unit. The advantages of the just-described heat-assisted magnetic recording head are as follows:

a) The head has an affinity with the conventional manufacturing method of thin-film magnetic heads because the opposed-to-medium surface and the element-integration surface are perpendicular to each other in the slider.

b) The light source can avoid suffering mechanical shock directly during operation because the light source is provided far from the opposed-to-medium surface.

c) The light source such as a laser diode and the head elements can be evaluated independently of each other; thus the degradation of manufacturing yield for obtaining the whole head can be avoided. Whereas, in the case that all the light source and head elements are provided within the slider, the manufacturing yield rate for obtaining the whole head is likely to decrease significantly due to the multiplication of the process yield for the light-source and the process yield for the head elements.

d) The head can be manufactured with reduced man-hour and at low cost, because of no need to provide the head with optical components such as a lens or prism which are required to have much high accuracy, or with optical elements having a special structure for connecting optical fibers or the like.

Manufacturing such a heat-assisted magnetic recording head requires a higher accuracy of alignment when joining the light source to the back surface of the slider. In fact, the present inventors have adopted a structure in which a waveguide is provided within a slider to guide light from a light source to the opposed-to-medium surface through the waveguide. When joining a light source unit to such a slider, the light-emission center of the light source needs to be made accurately coincide with the incident center of the waveguide located on the back surface of the slider in order to obtain sufficient light use efficiency. In practice, the accuracy required of the alignment is within +/−1 μm both in the waveguide-width direction (Y-axis direction, which will be described later) and the waveguide-thickness direction (Z-axis direction, which will be also described later).

If a laser diode is used as the light source, the outer surface of the laser diode on the opposite side to the adhered surface of the laser diode serves as one reference for the alignment between the light-emission center and the incident center. The light-emission center is at a position in an active layer between the n-electrode and p-electrode of the laser diode. The active layer is a predetermined distance apart from each of the n-electrode and the p-electrode. Accordingly, in both cases where the n-electrode is adhered and the p-electrode is exposed as the outer surface and where the p-electrode is adhered and the n-electrode is exposed as the outer surface, it is difficult to accurately recognize the location of the light-emission center in the alignment between the light source unit and the slider. Consequently, it is considerably difficult to achieve alignment in two directions (Y-axis and Z-axis directions, which will be described later) in the back surface of the slider, which may be likely to reduce the efficiency of mass-production of the head.

SUMMARY OF THE INVENTION

It is therefore an object of the present invention to provide a method for manufacturing a heat-assisted magnetic recording head, which is capable of joining a light source unit and a slider to each other with a sufficiently high alignment accuracy. Another object of the present invention is to provide a slider to which a light source unit can be joined with a sufficiently high alignment accuracy. Other objects of the present invention are to provide a heat-assisted magnetic recording head including such a slider, to provide a head gimbal assembly (HGA) including such a heat-assisted magnetic recording head, and to provide a magnetic recording apparatus including such an HGA.

Some terms used in the specification will be defined before explaining the present invention. In a layered structure or an element structure formed on an element-integration surface of a slider substrate of a slider according to the present invention, or in a layered structure or an element structure formed on an source-installation surface of a unit substrate in a light source unit according to the present invention, when viewed from a standard layer or element, a substrate side is defined as "lower" side, and the opposite side as an "upper" side. In a certain layer or element, a portion on the substrate side is defined as a "lower portion", and a portion on the opposite side as an "upper portion".

Further, in embodiments of the magnetic head according to the present invention, "X-, Y- and Z-axis directions" are indicated in some figures as needed. Here, Z-axis direction indicates above-described "up-and-low" direction, and +Z direction corresponds to a trailing side and −Z direction to a leading side. And Y-axis direction indicates a track width direction.

According to the present invention, provided is a manufacturing method of a heat-assisted magnetic recording head in which a light source unit including: a unit substrate having a joining surface; and a light source which is provided on a source-installation surface of the unit substrate and whose surface including an light-emission center is positioned on the joining surface side, is joined to a slider, the slider including:

a slider substrate having an opposed-to-medium surface; and a head part formed on an element-integration surface of the slider substrate, the head part including: a write head element for writing data on a magnetic recording medium; and a waveguide for guiding an incident light to the opposed-to-medium surface side, an end of the waveguide on the opposite side to the opposed-to-medium surface reaching an end surface of the head part on the opposite side to the opposed-to-medium surface, and the end of the waveguide having an incident center;

the manufacturing method comprising the steps of:

providing at least one marker on the end surface of the head part on the opposite side to the opposed-to-medium surface, the at least one marker being set so that a distance from the incident center of the waveguide to an end of the at least one marker on the opposite side to the element-integration surface in a direction perpendicular to the element-integration surface is substantially equal to a distance from the light-emission center of the light source to an end surface of the light source on the opposite side to the source-installation surface; and moving the light source unit and the slider relatively to each other while keeping the joining surface of the unit substrate in surface contact with an end surface of the slider substrate on the opposite side to the opposed-to-medium surface, and setting relative positions of the light source unit and the slider in a direction perpendicular to the element-integration surface to be positions in which an end of the at least one marker on the opposite side to the element-integration surface coincides with, or is at a distance within an acceptable range from, an edge of the surface including the light-emission center of the light source.

In the above-described manufacturing method, the provision of the special marker(s) described above enables the light source unit and the slider to be joined to each other with a sufficiently high alignment accuracy in the direction perpendicular to the element-integration surface. In particular, the light-emission center of the light source and the incident center of the waveguide, which are difficult to locate during alignment, can be reliably aligned with each other with a high accuracy without direct observation. This facilitates the alignment operation and can contribute to improve the manufacturing yield of the head.

In the manufacturing method according to the present invention, the at least one marker is preferably provided on the end surface of the head part on the opposite side to the opposed-to-medium surface so that: a distance from the element-integration surface to an end of the at least one marker on the element-integration surface side is substantially equal to a distance from the element-integration surface to the incident center; and a thickness of the at least one marker in the direction perpendicular to the element-integration surface is substantially equal to a distance from the light-emission center of the light source to the end surface of the light source on the opposite side to the source-installation surface.

With this setting, the distance from the incident center of the waveguide to the end of the at least one marker on the opposite side to the element-integration surface can be made substantially equal to the distance from the light-emission center of the light source to the end surface of the light source on the opposite side to the source-installation surface. The end surface of the light source on the opposite side to the source-installation surface can be an end surface farthest from the source-installation surface.

Further, as a method for aligning the light source unit and the slider in the track width direction, the manufacturing method according to the present invention preferably further comprises the steps of:

providing at least one light source marker on an end surface of the light source on the opposite side to the source-installation surface, at or near the edge on the joining surface side of the end surface of the light source, the at least one light source marker being set so that a distance from the light-emission center to an end of the at least one light source marker on the light-emission center side and/or on the opposite side to the light-emission center in a track width direction is substantially equal to a distance from the incident center to an end of the at least one marker on the incident center side and/or on the opposite side to the incident center in the track width direction; and moving the light source unit and the slider relatively to each other while keeping the joining surface of the unit substrate in surface contact with an end surface of the slider substrate on the opposite side to the opposed-to-medium surface, and setting relative positions of the light source unit and the slider in the track width direction to be positions in which the end of the at least one light source marker on the light-emission center side and/or on the opposite side to the light-emission center coincides with, or is at a distance within an acceptable range from, the end of the at least one marker on the incident center side and/or on the opposite side to the incident center in the track width direction.

Further, as another embodiment of the manufacturing method of a heat-assisted magnetic recording head according to the present invention, in which a light source unit including: a unit substrate having a joining surface; and a light source which is provided on a source-installation surface of the unit substrate and whose surface including an light-emission center is positioned on the joining surface side, is joined to a slider, the slider including:

a slider substrate having an opposed-to-medium surface; and a head part formed on an element-integration surface of the slider substrate, the head part including: a write head element for writing data on a magnetic recording medium; and a waveguide for guiding an incident light to the opposed-to-medium surface side, and an end of the waveguide on the opposite side to the opposed-to-medium surface reaching an end surface of the head part on the opposite side to the opposed-to-medium surface, the end of the waveguide having an incident center;

the manufacturing method comprising the steps of:

providing a step or a sloping portion in the end surface of the head part on the opposite side to the opposed-to-medium surface, the step or the sloping portion being set so that a distance from the incident center of the waveguide to an edge of the step or the sloping portion on the element-integration surface side is substantially equal to a distance from the light-emission center of the light source to an end surface of the light source on the opposite side to the source-installation surface; and moving the light source unit and the slider relatively to each other while keeping the joining surface of the unit substrate in surface contact with an end surface of the slider substrate on the opposite side to the opposed-to-medium surface, and setting relative positions of the light source unit and the slider in a direction perpendicular to the element-integration surface to be positions in which the edge of the step or the sloping portion on the element-integration surface side coincides with, or is at a distance within an acceptable range from, an edge of the surface including the light-emission center of the light source.

In the manufacturing method according to the present invention, at least one displacement measuring means is preferably used to determine relative positions of the light source unit and the slider in a direction perpendicular to the element-integration surface. In the case, the at least one displacement measuring means is preferably at least one laser displacement meter; the at least one laser displacement meter is preferably used to apply laser light to the end surface of the head part on the opposite side to the element-integration surface and the end surface of the light source on the opposite side to the source-installation surface, to obtain a profile of a displacement in the direction perpendicular to the element-integration surface; and the profile is preferably used to determine the relative positions. Here, actual displacement resolution in the output profile from a laser displacement meter is 0.1 µm or less, for example. Thus, highly accurate alignment can be achieved.

Further, the above-described aligning method by using the step or sloping portion according to the present invention preferably further comprises the steps of:

providing at least one marker on the end surface of the head part on the opposite side to the opposed-to-medium surface, the at least one marker being set so that the end of the at least one marker on the opposite side to the element-integration surface is positioned on the edge of the step or the sloping portion on the element-integration surface side;

providing at least one light source marker on the end surface of the light source on the opposite side to the source-installation surface, at a position where its end reaches the edge of the end surface on the joining surface side of the light source or near the edge of the end surface, the marker being set so that a distance from the light-emission center to an end of the at least one light source marker on the light-emission center side and/or on the opposite side to the light-emission center in the track width direction is substantially equal to a distance from the incident center to an end of the at least one marker on the incident center side and/or on the opposite side to the incident center; and moving the light source unit and the slider relatively to each other while keeping the joining surface of the unit substrate in surface contact with an end surface of the slider substrate on the opposite side to the opposed-to-medium surface, and setting relative positions of the light source unit and the slider in the track width direction to be positions in which the end of the at least one light source marker on the light-emission center side and/or on the opposite side to the light-emission center coincides with, or is at a distance within an acceptable range from, the end of the at least one marker on the incident center side and/or on the opposite side to the incident center in the track width.

According to the present invention, a slider for heat-assisted magnetic recording is provided, which constitutes a heat-assisted magnetic recording head by joining a light source unit including a light source provided on a source-installation surface of a unit substrate having a joining surface to an end surface of the slider on the opposite side to an opposed-to-medium surface of the slider. The slider comprises:

a slider substrate having the opposed-to-medium surface; and a head part formed on an element-integration surface of the slider substrate, the head part including: a write head element for writing data on a magnetic recording medium; and a waveguide for guiding an incident light to the opposed-to-medium surface side, an end of the waveguide on the opposite side to the opposed-to-medium surface having an incident center;

a step or a sloping portion being provided on an end surface of the head part on the opposite side to the opposed-to-medium surface, and a distance from the incident center of the waveguide to an edge of the step or sloping portion on the element-integration surface side being substantially equal to a distance from the light-emission center of the light source to an end surface of the light source on the opposite side to the source-installation surface.

In the above-described slider, at least one marker is preferably provided on the end surface of the head part on the opposite side to the opposed-to-medium surface, and an end of the at least one marker on the opposite side to the element-integration surface is preferably positioned on the edge of the step or sloping portion on the element-integration surface side. Further, it is also preferable that the at least one marker is an end surface of a marker layer appearing in the end surface of the head part on the opposite side to the opposed-to-medium surface, the marker layer provided in the head part.

According to the present invention, a heat-assisted magnetic recording head is provided, which is constituted by joining a light source unit to the above-described slider. In the head, at least one marker is provided on an end surface of the head part of the slider on the opposite side to the opposed-to-medium surface, and an end of the at least one marker on the opposite side to the element-integration surface is positioned on an edge of the step or sloping portion on the element-integration surface side;

the light source unit includes a unit substrate having a joining surface and a light source provided on a source-installation surface of the unit substrate; and at least one light source marker is provided on an end surface of the light source on the opposite side to the source-installation surface, at a position where its end reaches the edge of the end surface on the joining surface side of the light source or near the edge of the end surface, and a distance, in a track width direction, from the light-emission center to an end of the at least one light source marker on the light-emission center side and/or on the opposite side to the light-emission center is substantially equal to a distance, in the track width direction, from the incident center to an end of the at least one marker on the incident center side and/or on the opposite side to the incident center.

According to the present invention, an HGA is further provided, which comprises a suspension and the above-described heat-assisted magnetic head attached to the suspension. In the HGA, an end surface of the slider substrate on the opposite side to the opposed-to-medium surface is bonded to the suspension, the suspension includes an opening, and the light source unit protrudes through the opening on the opposite side to the slider in relation to the suspension.

According to the present invention, a magnetic recording apparatus is further provided, which comprises at least one HGA described above, at least one magnetic recording medium, and a control circuit for controlling read and write operations performed by the heat-assisted magnetic recording head to the at least one magnetic recording medium and for controlling light emission operation of the light source.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 3b shows a perspective view illustrating one embodiment of waveguide and near-field light generating element;

FIG. 3c shows a plain view illustrating the shapes on the head-part end surface of the ends of electromagnetic transducer, waveguide and near-field light generating element;

FIG. 4 shows a cross-sectional view taken by plane A in FIG. 3a, schematically illustrating a main part of the heat-assisted magnetic recording head;

FIGS. 6a to 6e show schematic views for illustrating an embodiment of the steps of fabricating the light source unit and the steps of joining the light source unit to the slider;

FIGS. 7a to 7c show schematic views for explaining another embodiment of alignment in the direction perpendicular to the element-integration surface (in Z-axis direction) in the steps of joining a light source unit to a slider;

FIGS. 8a and 8b show graphs schematically illustrating exemplary profiles of outputs from a laser displacement meter used for alignment;

DESCRIPTION OF THE PREFERRED EMBODIMENTS

Figure 1:
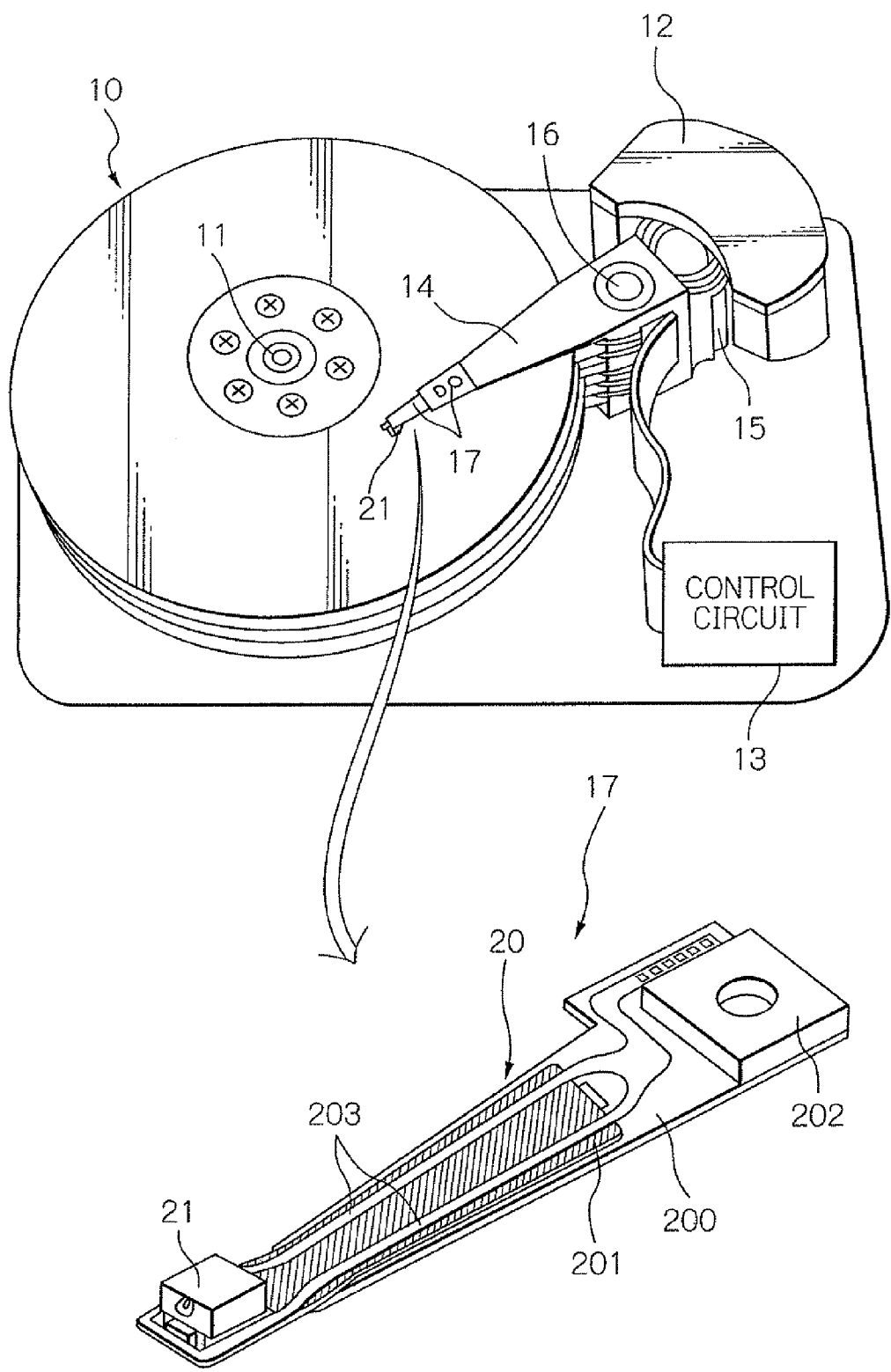
FIG. 1 shows a perspective view schematically illustrating a structure of a major part in one embodiment of a magnetic recording apparatus and a head gimbal assembly (HGA) according to the present invention.

FIG. 1 shows a perspective view schematically illustrating a structure of a major part in one embodiment of a magnetic recording apparatus and a head gimbal assembly (HGA) according to the present invention. Here, in the perspective view of the HGA, the side of the HGA opposed to the surface of the magnetic disk is presented as the upper side.

A magnetic disk apparatus as a magnetic recording apparatus shown in FIG. 1 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a heat-assisted magnetic recording head 21; and a recording/reproducing and light-emission control circuit 13 for controlling write/read operations of the heat-assisted magnetic recording head 21 and further for controlling the emission operation of a laser diode as a light source that generates laser light for heat-assisted magnetic recording, which will be described later.

The magnetic disk 10 is, in the present embodiment, designed for perpendicular magnetic recording, and has a structure in which, for example, sequentially stacked on a disk substrate is: a soft-magnetic under layer; an intermediate layer; and a magnetic recording layer (perpendicular magnetization layer). The assembly carriage device 12 is a device for positioning the heat-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 21 may be one.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The heat-assisted magnetic recording head 21 is fixed to the flexure 201 at the top end portion of the suspension 20 so as to face the surface of each magnetic disk 10 with a predetermined space (flying height). Moreover, one ends of the wiring member 203 are electrically connected to terminal electrodes of the heat-assisted magnetic recording head 21. The structure of the suspension 20 is not limited to the above-described one. An IC chip for driving the head may be mounted midway on the suspension 20, though not shown.

Figure 2:
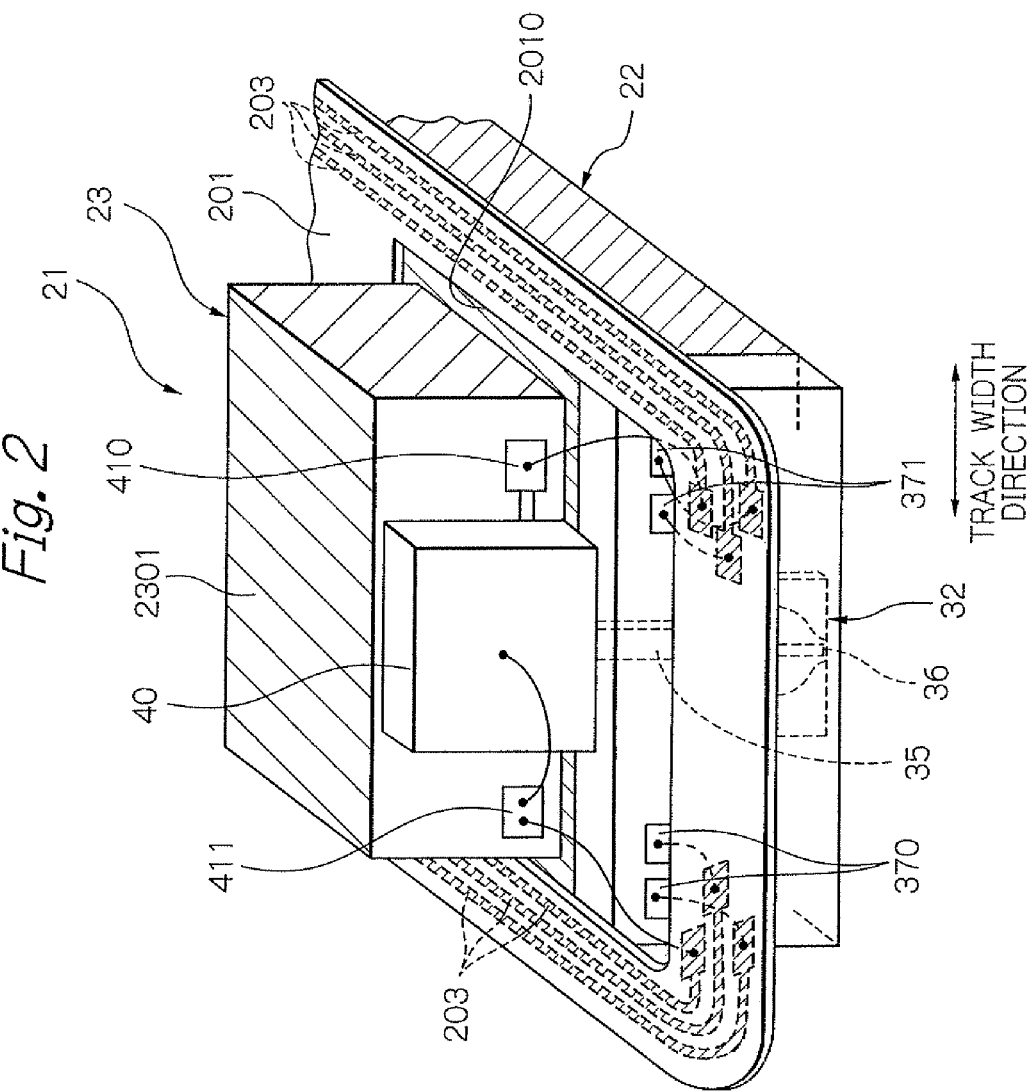
FIG. 2 shows a perspective view schematically illustrating an embodiment in which the heat-assisted magnetic recording head is attached on the flexure.

FIG. 2 shows a perspective view schematically illustrating an embodiment in which the heat-assisted magnetic recording head 21 is attached on the flexure 201. In the perspective view, the side of the head 21 opposed to the surface of the magnetic disk is turned downward.

As shown in FIG. 2, the heat-assisted magnetic recording head 21 is constituted by joining a light source unit 23 including a laser diode 40 as a light source to a slider 22. The slider 22 includes: a head element 32 for writing and reading data; a waveguide 35 for guiding laser light generated from the laser diode 40 to the opposed-to-medium surface; and a near-field light generating element 36 for generating near-field light by receiving the laser light. The flexure 201 has an aperture 2010; the light source unit 23 protrudes from the aperture 2010 on the side opposite to the slider 22 in relation to the flexure 201. Bonded to the flexure 201 is a portion of the end surface (back surface) opposite to the opposed-to-medium surface of the slider 22, on which the light source unit 23 does not exist.

Further, the slider 22 includes a pair of terminal electrodes 370 and a pair of terminal electrodes 371, which are provided for the head element 32. These terminal electrodes 370 and 371 are electrically connected to the connection pads of the wiring member 203 provided on the flexure 201. Further, the light source unit 23 includes two terminal electrodes 410 and 411, which are also electrically connected to the connection pads of the wiring member 203 provided on the flexure 201.

The just-described embodiment in which the heat-assisted magnetic recording head 21 is attached to the flexure 201 enables the stable fixing and the appropriate electric connection even in the case that the light source unit 23 protrudes from the slider 22. However, the embodiment for attaching the heat-assisted magnetic recording head 21 is not limited to the above-described one. For example, the end surface 3201 of the light source unit 23, opposite to the slider 22, may be bonded to the flexure 201. In this case, the aperture 2010 is unnecessary in the flexure 201.

Figure 3A:
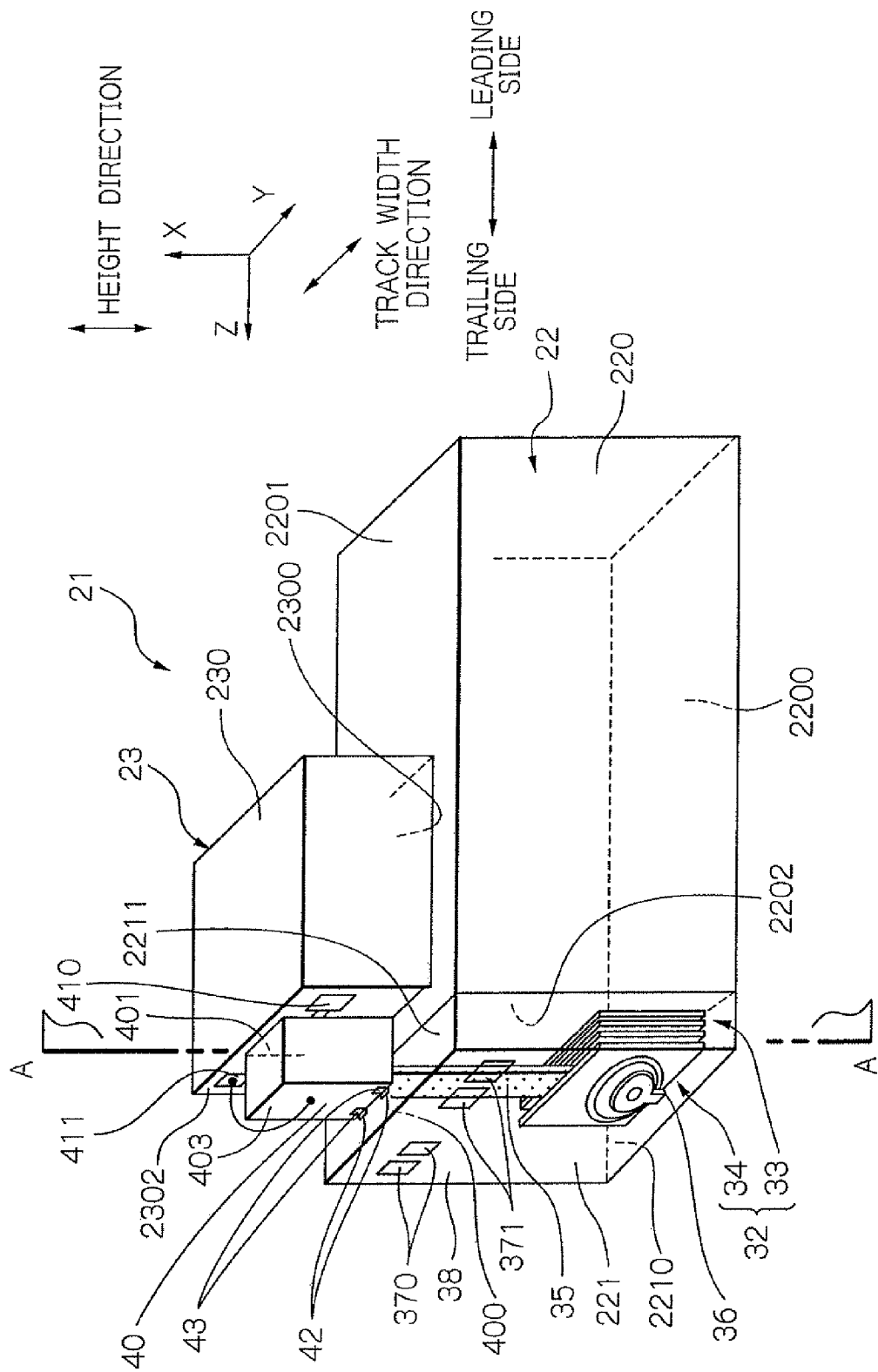
FIG. 3a shows a perspective view illustrating one embodiment of the heat-assisted magnetic recording head according to the present invention.

FIG. 3a shows a perspective view illustrating one embodiment of the heat-assisted magnetic recording head according to the present invention. FIG. 3b shows a perspective view illustrating one embodiment of waveguide 35 and near-field light generating element 36. Further, FIG. 3c shows a plain view illustrating the shapes on the head-part end surface 2210 of the ends of electromagnetic transducer 34, waveguide 35 and near-field light generating element 36.

As shown in FIG. 3a, a heat-assisted magnetic recording head 21 is constituted of the slider 22 and the light source unit 23 as described above. The slider 22 includes: a slider substrate 220 having an ABS 2200 processed so as to provide an appropriate flying height, and formed of, for example, AlTiC ($Al_2O_3$—TiC); and a head part 221 formed on an element-integration surface 2202 perpendicular to the ABS 2200. While, the light source unit 23 includes: a unit substrate 230 having an joining surface 2300, and formed of, for example, AlTiC ($Al_2O_3$—TiC); and a laser diode 40 as a light source provided on a source-installation surface 2302 perpendicular to the joining surface 2300. The slider 22 and the light source unit 23 are bonded to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220.

In the slider 22, the head part 221 formed on the element-integration surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 provided through between the MR element 33 and the electromagnetic transducer 34 in the present embodiment; a near-field light generating element 36 for generating near-field light to heat a portion of the magnetic record layer of the magnetic disk; an overcoat layer 38 formed on the element-integration surface 2202, so as to cover the MR element 33, the electromagnetic transducer 34, the waveguide 35 and the near-field light generating element 36; a pair of terminal electrodes 370 exposed in the upper surface of the overcoat layer 38 and electrically connected to the MR element 33; a pair of terminal electrodes 371 also exposed in the upper surface of the overcoat layer 38 and electrically connected to the electromagnetic transducer 34; and at least one marker layer 42 (two in the present embodiment) for joining the light source unit 23 to the slider 22 with a high alignment (positioning) accuracy, one end surface of which is exposed in the head-part end surface 2211 on the opposite side to the ABS 2200, as will be described in detail later One ends of the MR element 33, the electromagnetic transducer 34 and the near-field light generating element 36 reach the head-part end surface 2210 of the head part 221, which is opposed to the medium surface. Here, the head-part end surface 2210 and the ABS 2200 constitute the whole opposed-to-medium surface of the heat-assisted magnetic recording head 21. During actual write and read operations, the heat-assisted magnetic recording head 21 aerodynamically flies above the surface of the rotating magnetic disk with a predetermined flying height. Thus, the ends of the MR element 33 and electromagnetic transducer 34 face the surface of the magnetic record layer of the magnetic disk with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the waveguide 35, is irradiated onto the near-field light generating element 36. The irradiation causes near-field light to be generated from the end of the near-field light generating element 36 which extends to the head-part end surface 2210. The generated near-field light reaches the surface of the magnetic disk, and heats a portion of the magnetic record layer of the magnetic disk. As a result, the anisotropic magnetic field (coercive force) of the portion is decreased to a value that enables writing; thus the heat-assisted magnetic recording can be accomplished.

The waveguide 35 is positioned, as shown in FIG. 3a, parallel to the element-integration surface 2202 and between the MR element 33 and the electromagnetic transducer 34. And the waveguide 35 extends from its end surface 350 on the head-part end surface 2210 to the opposite end surface 352 on the head-part end surface 2211. The waveguide 35 may have a rectangular parallelepiped shape, or may have a portion on the head-part end surface 2210 side, which tapers in the track width direction (Y-axis direction), as shown in FIG. 3b. The width $W_{WG}$ in the track width direction (Y-axis direction) of the waveguide 35 may be, for example, in the range approximately from 1 to 200 μm (micrometers), and the thickness $T_{WG}$ (in Z-axis direction) may be, for example, in the range approximately from 2 to 10 μm, and the height $H_{WG}$ (in X-axis direction) may be, for example, in the range approximately from 10 to 300 μm.

Further, as shown in FIG. 3b, both the side surfaces 351, the lower surface 353 and the upper surface 354 of the waveguide 35 have a contact with the overcoat layer 38 (FIG. 3a). The waveguide 35 is formed of a dielectric material with refractive index n higher than that of the constituent material of the overcoat layer 38, made by using, for example, a sputtering method. For example, in the case that the overcoat layer 38 is formed of $SiO_2$ (n=1.5), the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_XO_Y$ (n=1.7–1.85), $Ta_2O_5$ (n=2.16), $Nb_2O_5$ (n=2.33), TiO (n=2.3–2.55) or $TiO_2$ (n=2.3–2.55). This material structure of the waveguide 35 not only enables the propagation loss of laser light to be reduced due to the excellent optical characteristics of the constituent material, but also provides the total reflection in both the side surfaces 351, the lower surface 353 and the upper surface 354 due to the existence of the overcoat layer 38 as a clad. As a result, more amount of laser light can reach the near-field light generating element 36, which improves the efficiency of generating the near-field light.

As shown in FIGS. 3b and 3c, the near-field light generating element 36 is a plate-like member provided on the end surface 350 of the waveguide 35, one end surface of which reaches the head-part end surface 2210. In the present embodiment, when viewing from the head-part end surface 2210 side (as shown in FIG. 3c), the near-field light generating element 36 has a triangular shape with a bottom edge 360 extending in the track width direction and an apex 361 positioned on the electromagnetic transducer 34 side of the bottom edge 360 (on the trailing side). The triangular shape is preferably an isosceles triangle in which base angles in both ends of the bottom edge 360 are equal. The apex 361 is positioned so as to be opposed to the edge on the leading side of a main magnetic pole 3400 of the electromagnetic transducer 34 described later. The main magnetic pole 3400 has, when viewing from the head-part end surface 2210 side (as shown in FIG. 3c), a rectangular or square shape, or may have a trapezoidal shape. In either case, the apex 361 of the near-field light generating element 36 is positioned near the edge on the leading side of the main magnetic pole 3400.

Under the above-described configuration on the head-part end surface 2210, irradiating laser light 48 to the near-field light generating element 36 causes near-field light to be generated mainly from the apex 361 due to the concentration of electric field in the vicinity of the apex 361. That is, the apex 361 and its vicinity becomes a main heating portion during the heat-assisted operation of heating a portion of the magnetic record layer of the magnetic disk. Further, because the apex 361 and its vicinity as a main heating portion is positioned much close to the main magnetic pole 3400 as a writing portion, write magnetic field can be applied shortly after applying heat to a portion of the magnetic record layer. As a result, stable write operation with the heat-assist can be performed reliably. The form of the near-field light generating element 36 is not limited to the above-described one; further, it is possible for the laser light emitting from the end surface 350 of the waveguide 35 to directly heat the magnetic recording layer, without any near-field light generating element in the slider 22.

The near-field light generating element 36 is preferably formed of a conductive material such as Au, Ag, Al, Cu, Pd, Pt, Rh or Ir, or the alloy of at least two of these elements. Further, the apex 361 of the element 36 preferably has a curvature radius in the range 5 to 100 nm (nanometers). It is preferable that the distance $D_{NF}$ in Z-axis direction between the bottom edge 360 and the apex 361 is sufficiently smaller than the wavelength of the incident laser light, being preferably in the range of 20 to 400 nm. It is also preferable that the width $W_{NF}$ of the bottom edge 360 is sufficiently smaller than the wavelength of the incident laser light 48, being preferably in the range of 20 to 400 nm. Further, the thickness $T_{NF}$ in X-axis direction of the near-field light generating element 36 is preferably in the range of 10 to 100 nm.

Furthermore, it is preferable that the waveguide 35 has a multilayered structure of dielectric materials in which the upper a layer is, the higher becomes the refractive index n of the layer. The multilayered structure can be realized, for example, by sequentially stacking dielectric materials of $SiO_XN_Y$ with the composition ratio X and Y appropriately changed. The number of stacked layers may be, for example, in the range from 8 to 12. In the case that laser light 48 is linearly polarized in Z-axis direction, the above-described structure enables a light spot on the end surface 350 of the laser light 48 to be closer to the electromagnetic transducer 34 (on the trailing side) in Z-axis direction (in the direction along thickness $T_{WG}$). As a result, the near-field light generating element 36 can be provided much closer to the electromagnetic transducer 34 (on the trailing side) on the end surface 350. That is, the apex 361 of the near-field light generating element 36 is positioned more adjacent to the edge on the leading side of the main magnetic pole 3400 of the electromagnetic transducer 34 described later, which enables near-field light to be irradiated more adequately on the write position at the time of writing.

Backing to FIG. 3a, the light source unit 23 includes: the unit substrate 230, the laser diode 40 provided on the source-installation surface 2302 of the unit substrate 23; the terminal electrode 410 electrically connected to the lower surface 401 as an electrode of the laser diode 40; and the terminal electrode 411 electrically connected to the upper surface 403 as an electrode of the laser diode 40. By applying a predetermined voltage between both electrodes 410 and 411 of the laser diode 40, laser light radiates from the light-emission center on an emission surface 400 of the laser diode 40.

The laser diode 40 is installed on the unit substrate 230 in such a manner that the light-emitting surface 400 of the laser diode 40 is in the same plane as the joining surface 2300 of the unit substrate 230 or in a position somewhat recessed from the joining surface 2300. At least one (two in the present embodiment) light source marker 43 is provided on the upper surface 403 of the laser diode 40. The light source markers 43 are disposed at the position where its end reaches the edge on the joining surface 2300 side of the upper surface 403, or are disposed near the edge. In the heat-assisted magnetic recording head 21 in which the light source unit 23 and the slider 22 are joined together, the joining surface 2300 of the unit substrate 230 has a surface contact with the head-part end surface 2211 and the back surface 2201 of the slider substrate 220. Then, the light source unit 23 and the slider 22 can be readily joined to each other with a very high alignment accuracy by using the light source marker 43 and the marker layer 42 of the slider 22, as will be describe in detail later.

Each of the terminal electrodes 410 and 411 includes: a base layer formed on the source-installation surface 2302 of the unit substrate 230, made of, for example, Ta or Ti with thickness of approximately 10 nm; and a conductive layer formed on the base layer, made of, for example, Au or Cu with thickness of approximately 1 to 3 μm. As shown in FIG. 3a, the terminal electrode 410 may be electrically connected to the lead line extended from the lower surface 401 as an electrode of the laser diode 40, and the terminal electrode 411 may be electrically connected through a boding wire to the upper surface 403 as an electrode of the laser diode 40.

As explained above, the heat-assisted magnetic recording head 21 has a structure in which the slider 22 and the light source unit 23 are joined to each other. Therefore, the head 21 can be fabricated after the slider 22 and the light source unit 23 are manufactured independently of each other. As a result, for example, the characteristics of the light source unit 23 can be evaluated in advance; then only the non-defective unit can be used for the head fabrication. In this case, the manufacturing yield for obtaining the whole head becomes almost the same as the manufacturing yield of the slider 22. Therefore, the degradation of the manufacturing yield for obtaining the whole head can be avoided, the degradation depending on the percent defective of the laser diode 40. Further, because the light source unit 23 is joined to the back surface 2201 opposite to the ABS 2200 of the slider 22, the laser diode 40 can be definitely located far away from the ABS 2200. As a result, the direct mechanical shock to the laser diode 40 during operation can be avoided. Further, the head 21 has an affinity with the conventional manufacturing method of thin-film magnetic heads because the ABS 2200 and the element-integration surface 2202 are perpendicular to each other in the slider 22. Furthermore, the heat-assisted magnetic recording head 21 can be manufactured with reduced man-hour and at low cost, because of no need to provide the head 21 with optical components such as a lens or prism which are required to have much high accuracy, or optical elements having a special structure for connecting optical fibers or the like.

Each of the slider 22 and light source unit 23 may have an arbitrary size. For example, the slider 22 may be so-called a femto slider in which the width in the track width direction (Y-axis direction) is 700 μm; the length in Z-axis direction is 850 μm; and the thickness in X-axis direction is 230 μm. In the case, the light source unit 23 may be one size smaller than the slider 22, for example, in which the width in the track width direction is 425 μm; the length is 300 μm; and the thickness is 300 μm.

FIG. 4 shows a cross-sectional view taken by plane A in FIG. 3a, schematically illustrating a main part of the heat-assisted magnetic recording head 21.

As shown in FIG. 4, the MR element 33 is formed on the insulating layer 380 stacked on the element-integration surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.5 to 3 μm.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that is electrically connected to the MR multilayer 332.

In the case of TMR multilayer, for example, the MR multilayer 332 may have a stacked structure in which sequentially stacked are: an antiferromagnetic layer made of, for example, IrMn, PtMn, NiMn or RuRhMn, with thickness of approximately 5 to 15 nm; a magnetization-direction-fixed layer (pinned layer) in which two ferromagnetic layers such as CoFe sandwich a non-magnetic metal layer such as Ru therebetween, and the direction of the magnetization is fixed by the antiferromagnetic layer; a tunnel barrier layer made of a non-magnetic dielectric material obtained by the process that a metal film such as Al or AlCu, for example, with thickness of approximately 0.5 to 1 nm is oxidized by oxygen introduced into the vacuum equipment, or is naturally oxidized; and a magnetization-direction-free layer (free layer) having a double-layered structure of a ferromagnetic material such as CoFe, for example, with thickness of approximately 1 nm and a ferromagnetic material such as NiFe, for example, with thickness of approximately 3 to 4 nm, which has a tunnel exchange interaction with the pinned layer through the tunnel barrier layer.

Also as shown in FIG. 4, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic record layer (perpendicular magnetization layer) of the magnetic disk 10, the magnetic flux being excited by write current flowing through the write coil layer 343. The main magnetic pole layer 340 has a double-layered structure in which a main magnetic pole 3400 and a main pole body 3401 are stacked sequentially and magnetically coupled with each other. The main magnetic pole 3400 is isolated by being surrounded with an insulating layer 384 formed of an insulating material such as $Al_2O_3$ (alumina). The main magnetic pole 3400 reaches the head-part end surface 2210, and includes: a main pole front end 3400a extending to the head-part end surface 2210, with a small width $W_P$ (FIG. 3c) in the track width direction; and a main pole rear end 3400b located at the rear of the main pole front end 3400a and having a width in the track width direction larger than that of the main pole front end 3400a. Here, the small width $W_P$ of the main pole front end 3400a enables a fine write magnetic field to be generated, so that the track width can be set to be a very small value adequate for higher recording density.

As shown in FIG. 3c, the main magnetic pole 340 appearing on the head-part end surface 2210 has a rectangular or square shape in the present invention, however may have a trapezoidal shape. In either case, the above-described width $W_P$ is the length of the edge on the leading side (−Z direction side) of the shape, which determines the width of track formed on the magnetic recording layer (perpendicular magnetization layer) of the magnetic disk. The width $W_P$ is, for example, in the range of approximately 0.05 to 0.5 μm.

Backing to FIG. 4, the main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the main magnetic pole 3400 is, for example, in the range of approximately 0.2 to 0.5 μm. The gap layer 341 forms a gap provided for separating the main magnetic pole layer 340 from the write shield layer 345 in the region near the head-part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the spacing between the main magnetic pole layer 340 and the write shield layer 345, and is, for example, in the range of approximately 0.01 to 0.5 μm.

The write coil layer 343 is formed on a insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 4, and may be, for example, in the range from two to seven.

The write shield layer 345 reaches the head-part end surface 2210, and acts as a magnetic path for the magnetic flux returning from a soft-magnetic under layer that is provided under the perpendicular magnetization layer of the magnetic disk. The thickness of the write shield layer 345 is, for example, approximately 0.5 to 5 μm. Further, the write shield layer 345 has a trailing shield 3450 that is a portion opposed to the main magnetic pole layer 340. The trailing shield 3450 also extends to the head-part end surface 2210, and is provided for receiving the magnetic flux spreading from the main magnetic pole layer 340. The trailing shield 3450, according to the present embodiment, is planarized together with an insulating layer 3420 and the main pole body 3401, and has a width in the track width direction larger than the width of the main pole rear end 3400b and the main pole body 3401 as well as the main pole front end 3400a. This trailing shield 3450 causes the magnetic field gradient between the end portion of the trailing shield 3450 and the main pole front end 3400a to be steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Further, in the present embodiment, an inter-element shield layer 39 is provided between the MR element 33 and the electromagnetic transducer 34, sandwiched by the insulating layers 382 and 383. The inter-element shield layer 39 plays a role for shielding the MR element 33 from the magnetic field generated from the electromagnetic transducer 34, and may be formed of the same soft-magnetic material as the upper and lower shield layers 334 and 330. The inter-element shield layer 39 is not indispensable: the embodiment without the inter-element shield layer could be in the scope of the present invention. Further, a backing coil portion may be provided between the inter-element shield layer 39 and the waveguide 35. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk. Meanwhile, the above-described insulating layers 380, 381, 382, 383, 384 and 385 constitute the overcoat layer 38.

Alternatively, the electromagnetic transducer 34 may be designed for longitudinal magnetic recording. In this case, an upper magnetic pole layer and a lower magnetic pole layer are provided instead of the main magnetic pole layer 340 and the write shield layer 344, and further provided is a write gap layer pinched by the end portions on the head-part end surface 2210 side of the upper and lower magnetic pole layers. Write operation is performed by using leakage field generated from the pinched portion of the write gap layer. In this case, the magnetic disk 10 (FIG. 1) is also designed for longitudinal magnetic recording.

In FIG. 4, a marker layer 42 is provided in such a manner that one end surface 420 of the marker layer 42 is exposed in the head-part end surface 2211 of the slider 22 as described above. The end surface 420 functions as an alignment marker. The distance $D_{WM}$ from the incident center 3520 of the waveguide 35 to the edge of the end surface (marker) 420 of the marker layer 42 on the opposite side to the element-integration surface 2202 in the direction perpendicular to the element-integration surface 2202 (in Z-axis direction) is set so that the distance $D_{WM}$ is substantially equal to the distance $D_{EU}$ from the emission center 4000 of the laser diode 40 to the upper surface 403 of the laser diode 40, that is, the end surface on the opposite side to the source-installation surface 2302. That is, substantially $D_{WM}=D_{EU}$. Here, "substantially equal" means that the difference between the distances $D_{WM}$ and $D_{EU}$ is within a range including an alignment error, even with which the sufficient amount of light for heat assist, emitted from the light source unit, enters the waveguide 35 from the end surface 352 when alignment in Z-axis direction is accomplished. The end surface of the laser diode 40 on the opposite side to the source-installation surface 2302, that is, the upper surface 403, which is the base of the distance $D_{EU}$, can be the end surface of the laser diode 40 that is farthest from the source-installation surface 2302. Although the bottom surface of grooves 55 (FIG. 5) provided in the upper surface 403, as will be described later, can be used as the base of the distance $D_{EU}$, preferably an flat surface other than the grooves 55 in the upper surface 403 is used as the base.

The marker layer 42 may be set so that the distance $D_{SM}$ from the element-integration surface 2202 to the edge of the marker 420 on the element-integration surface 2202 side is substantially equal to the distance $D_{SW}$ from the element-integration surface 2202 to the incident center 3520; and the thickness $T_{MK}$ of the maker 420 in the direction perpendicular to the element-integration surface 2202 (in Z-axis direction) is substantially equal to the distance $D_{EU}$ from the emission center 4000 of the laser diode 40 to the upper surface 403 of the laser diode 40. That is, substantially $D_{SM}=D_{SW}$ and $T_{MK}=D_{EU}$. This is practically equivalent to $D_{WM}=D_{EU}$. By using the marker layer 42 described above, the relative locations of the light source unit 23 and the slider 22 in the direction perpendicular to the element-integration surface 2202 (in Z-axis direction) can be determined with a sufficiently high alignment accuracy, as will be described in detail later.

The marker layer 42 can be made of a material, for example NiFe (Parmalloy), which can be distinguished from the surrounding overcoat layer 38 under a microscope, and has a thickness $T_{MK}$ equal to the distance $D_{EU}$, which may be, for example, approximately 0.5 to 4 μm. Alternatively, a portion of the head-part end surface 2211 may be textured to form a small irregularity pattern and serve as a marker, or an extra-thin layer pattern may be formed on the head-part end surface 2211 and serve as a marker. The mode in which the end surface 420 of the marker layer 42 is used as a marker as described above has the advantage that the conditions $D_{SM}=D_{SW}$ and $T_{MK}=D_{EU}$ or the condition $D_{WM}=D_{EU}$ can be more readily implemented in the film-formation process.

Again in FIG. 4, a light source marker 43 is provided on the upper surface 403 of the laser diode 40 at or near the edge of the upper surface 403 on the joining surface 2300 side as described above. The light source marker 43 may be a thin-layer pattern made of an insulating material, for example. In this case, the distance $D_{EU}$ is actually the distance from the emission center 4000 of the laser diode 40 to the upper surface of the light source marker 43, when the position of the light source unit 23 relative to the slider 22 in the direction perpendicular to the element-integration surface 2202 (in the Z-axis direction) is determined in actual alignment. However, by choosing the thickness of the layer of the light source marker 43 to be very thin, for example less than 0.1 μm, the distance $D_{EU}$ can be assumed to be the distance from the emission center 4000 of the laser diode 40 to the upper surface 403 of the laser diode 40. Alternatively, a portion of the upper surface 403 of the laser diode 40 may be textured to form a small irregularity pattern and the pattern may be used as the light source marker 43.

The incident center 3520 on the end surface 352 of the waveguide 35 may be the center of the end surface 352 in the direction perpendicular to the element-integration surface 2202 (in Z-axis direction). However, if the waveguide 35 has a multilayered structure of dielectric materials as described above, the incident center 3520 in the end surface 352 may be set at a position other than the center point by controlling the layer configuration. The distance $D_{SW}$ from the element-integration surface 2202 to the incident center 3520 may be approximately 0.5 to 20 μm, for example. The distance from the incident center 3520 to the upper surface of the overcoat layer 38 may be approximately 5 to 30 μm, for example. On the other hand, the emission center 4000 of the laser diode 40 may be the center point of an active layer 40e in the direction perpendicular to the source-installation surface 2302 (in Z-axis direction). Here, the distance $D_{EU}$ from the emission center 4000 to the upper surface 403 of the laser diode 40 may be, for example, approximately 0.5 to 10 μm.

Figure 5:
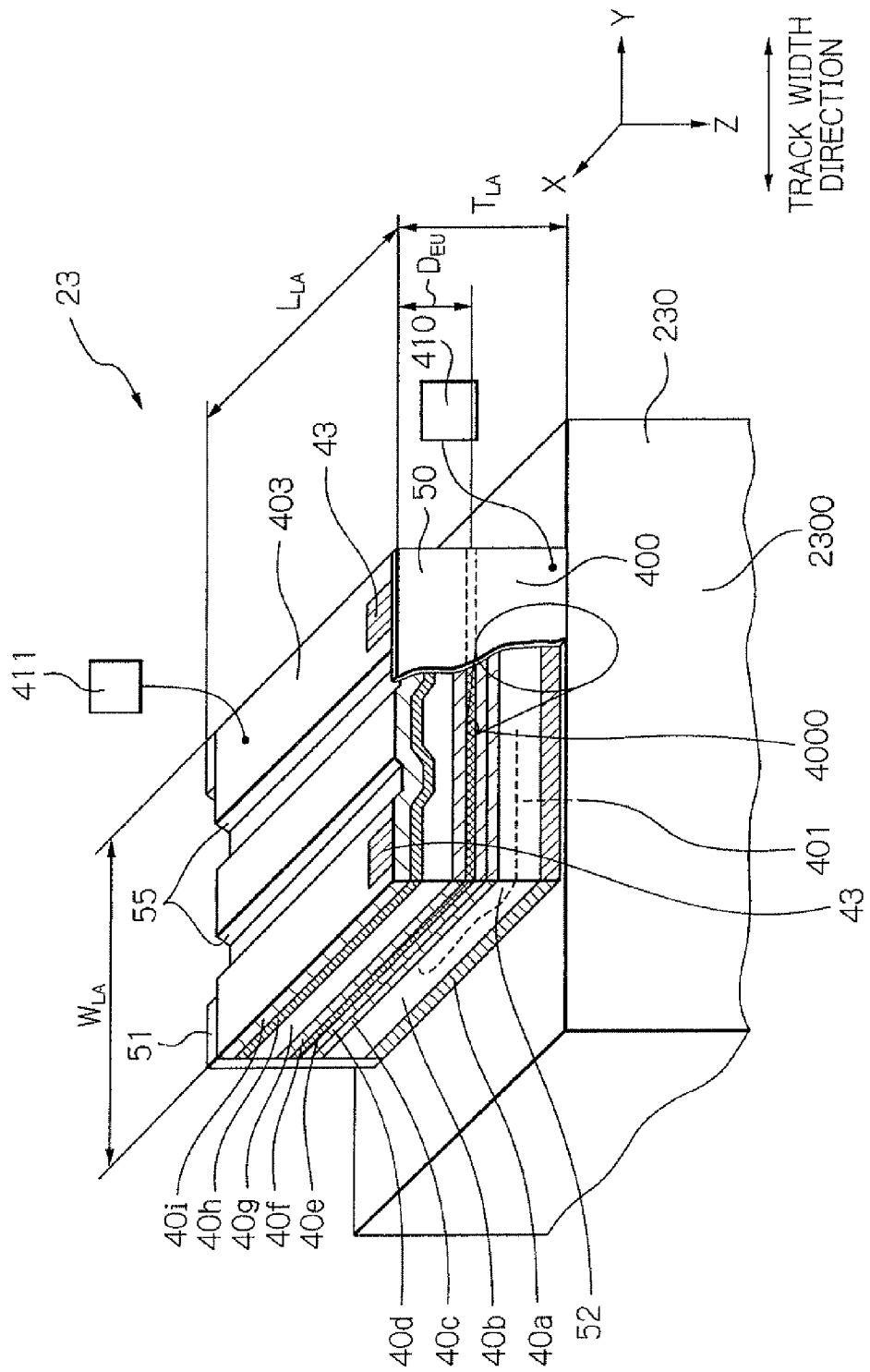
FIG. 5 shows a perspective view illustrating the structure of the laser diode and the state of joining the laser diode to the unit substrate.

FIG. 5 shows a perspective view illustrating the structure of the laser diode 40 and the state of joining the laser diode 40 to the unit substrate 230.

According to FIG. 5, the laser diode 40 has, in the present embodiment, a multilayered structure in which sequentially stacked from the unit substrate 230 side is: an n-electrode 40a; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode 40i. The lower surface 401 of the laser diode 40 is equivalent to the lower surface of the n-electrode 40a. And the upper surface 403 is equivalent to the upper surface of the p-electrode 40i, and has grooves 55 extending in X-axis direction corresponding to the ridge structure of laser diode. The ridge structure is formed of concavity and convexity that exist on the p-electrode side and ranges over the clad layer, and is provided for confining and concentrating the laser light on the light-emission center. Here, the p-electrode 40i may be formed of, for example, Au with thickness of approximately 5 μm. Although not shown, if the p-electrode 40i is recessed from the joining surface 2300, the upper surface 403 of the laser diode 40 can be the upper surface of the p-electrode base layer 40h.

As has been described above, the laser diode 40 has a structure in which a multilayer including the active layer 40e is sandwiched between the n-electrode 40a and the p-electrode 40i. The active layer 40e is positioned closer to the p-electrode 40i than the n-electrode 40a. Accordingly, when the n-electrode 40a is bonded to the unit substrate 230 as describe above, the distance $D_{EU}$ between the surface (the upper surface 403) to be used as one reference for alignment and the light-emission center 4000 is smaller as compared with the case where the p-electrode 40i is bonded to the unit substrate 230. The reduction of the distance $D_{EU}$ contributes to improvement of the alignment accuracy. However, the alignment method of the present invention is also applicable to the case where the p-electrode 40i is bonded to the unit substrate 230.

On the front and rear cleaved surfaces of the multilayered structure of the laser diode 40, respectively formed are reflective layers 50 and 51 made of, for example, $SiO_2$ or $Al_2O_3$ for exciting the oscillation by total reflection. The outer surface of the reflective layer 50 is the light-emission surface 400. Further, the reflective layer 50 has an opening (not shown in the figure) in the position of the active layer 40e including the light-emission center 4000.

The wavelength $\lambda_L$ of the radiated laser light may be, for example, in the range of approximately 400 to 650 nm. It should be noted that there is an appropriate exciting wavelength according to the constituent material of the near-field light generating element 36. For example, the wavelength $\lambda_L$ of the laser light is preferably a value close to 600 nm in the case that the near-field light generating element 36 is formed of Au.

The laser diode 40 has, for example, a width $W_{LA}$ of approximately 200 to 350 μm, a length (depth) $L_{LA}$ of 250 to 600 μm, and a thickness $T_{LA}$ of approximately 60 to 200 μm. The width $W_{LA}$ of the laser diode 40 may be decreased to approximately 100 μm. However, the $L_{LA}$ of the laser diode 40 relates to the electric current density, thus cannot be set to be a much smaller value. In first place, the laser diode 40 preferably has a certain size for facilitating the handling of the laser diode 40 during mounting.

An electric source provided within the magnetic disk apparatus can be used for driving the laser diode 40. In fact, the magnetic disk drive apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk drive apparatus. In practice, a predetermined voltage is applied between the terminal electrode 410 connected electrically to the p-electrode 40i and the terminal electrode 411 connected electrically to the n-electrode 40a by using the electric source, to oscillate the laser diode 40. Then, laser light radiates from the opening including the light-emission center 4000 of the reflective layer 50.

Also as shown in FIG. 5, the lower surface 401 that is the lower surface of the n-electrode 40a, is bonded to the source-installation surface 2302 of the unit substrate 230. This bonding can be performed by, for example, soldering with AuSn alloy 52 as a Pb-free solder. Here, the unit substrate 230 formed of, for example, AlTiC can have electric conductivity. Thus, the unit substrate 230 can acts as a ground connected to the n-electrode 40a.

The laser diode 40 and terminal electrodes 410 and 411 are not limited to the above-described embodiment. For example, the laser diode 40 may have another structure using other semiconducting materials such as GaAlAs system. Solders other than the above described can also be used for soldering the electrode of the laser diode 40. Further, the electrodes of the laser diode 40 may be isolated from the unit substrate, and then, terminal electrodes may be formed.

FIGS. 6a to 6e show schematic views for illustrating an embodiment of the steps of fabricating the light source unit 23 and the steps of joining the light source unit 23 to the slider 22.

Figure 6A:
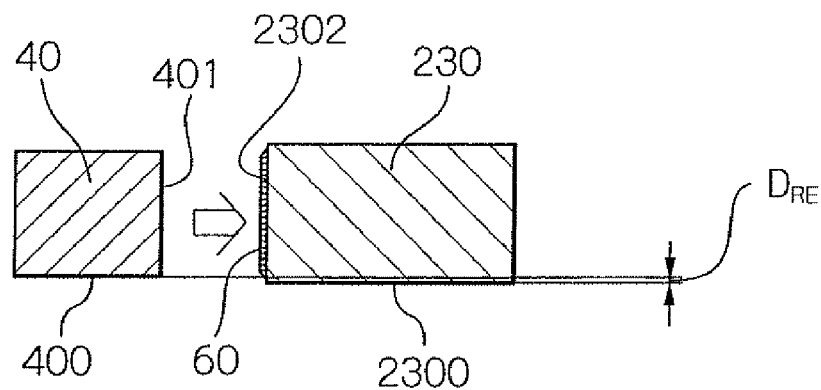

First, as shown in FIG. 6a, a film of an AuSn alloy 60 is deposited to a thickness of approximately 0.7 to 1 µm by vapor deposition, and the laser diode 40 is placed on the deposited film, then is heated under a hot-air blower using a hot plate or the like to a temperature of approximately 200 to 300° C. to fix the laser diode 40 to the unit substrate 230. When soldering with the AuSn alloy is performed, the light source unit should be heated to a high temperature, for example approximately 300° C. However, the head element in the slider 22 is not adversely affected by the high temperature because the light source unit 23 is manufactured separately from the slider 22. When the laser diode 40 is placed on the deposited film 60 of the AuSn alloy, the laser diode 40 is positioned in such a manner that the light-emitting surface 400 of the laser diode 40 is flush with the joining surface 2300 of the unit substrate 230 or is recessed by a predetermined amount $D_{RE}$ from the joining surface 2300. This can avoid excessive mechanical stress from being applied to the laser diode 40 during the following attachment of the unit substrate 230 to the slider 22. Then, the terminal electrode 411 and the electrode forming the upper surface 403 of the laser diode 40 are connected to each other by bonding wire. This completes the fabrication of a light source unit 23.

Figure 6B:
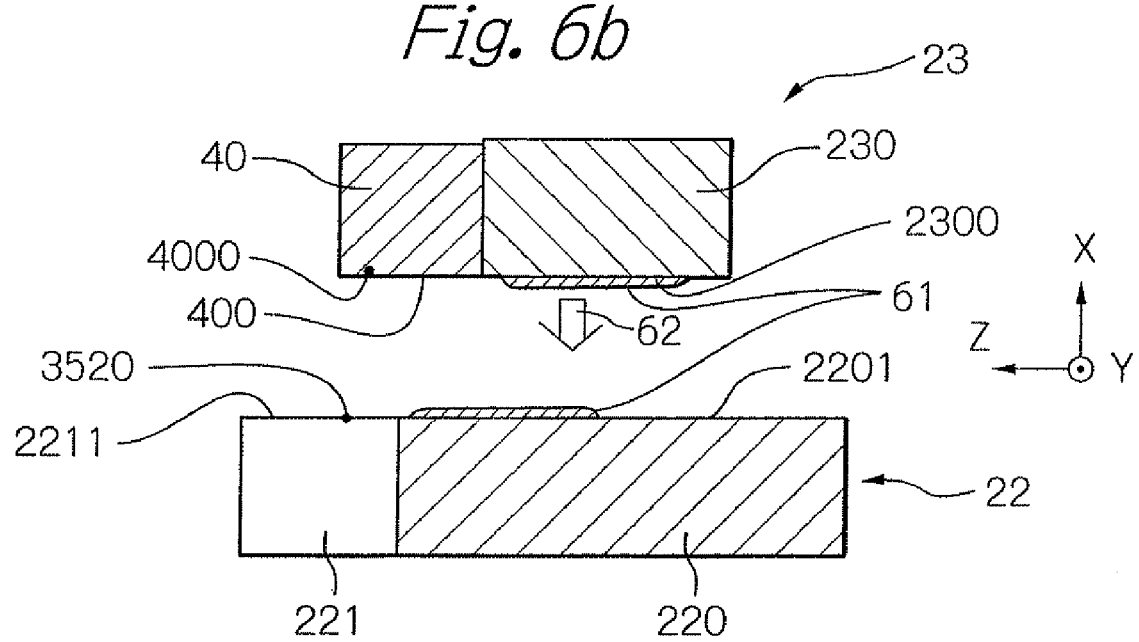

Then, as shown in FIG. 6b, a UV (ultraviolet) cure adhesive 61 is applied beforehand to the back surface 2201 of the slider 22 or the joining surface 2300 of the light source unit 23 or the both. The UV cure adhesive 61 may be a UV cure epoxy resin, a UV cure acrylic resin, or the like. Then, the light source unit 23 is moved toward slider 22 in the direction indicated by arrow 62 (in X-axis direction) until the joining surface 2300 of the light source unit 23 is brought into a surface contact with the head-part end surface 2211 and the back surface 2201 of the slider 22 as shown in FIG. 6c. In doing this, the marker 420 is preferably visible on the head-part end surface 2211 of the slider 22. Hereinafter, the locations of the marker 420 and a light source marker 43 described later can be confirmed by using, for example, an optical microscope. The alignment between the light source unit 23 and the slider 22 can be performed by using an alignment device having holders for holding them, for example.

Then, also as shown in FIG. 6c, the light source unit 23 is moved in an appropriate direction, for example in the direction indicated by arrow 63 (in Z-axis direction) while keeping the light source unit 23 in the surface contact. In doing so, as shown in FIG. 6d, the position of the light source unit 23 is adjusted so that the edge 4200 of the marker 420 on the opposite side to the element-integration surface 2202 coincides with the edge 4001 of the light-emitting surface 400 of the laser diode 40 including the light-emission center 4000, or the edge 4200 is at a distance $E_{US1}$ from the edge 4001 within an acceptable range. Here, the distance $D_{WM}$ from the incident center 352 to the edge 4200 of the marker 420 in the direction perpendicular to the element-integration surface 2202 (in Z-direction) is set to be substantially equal to the distance $D_{EU}$ from the light-emission center 4000 to the upper surface 403 of the laser diode 40, that is, $D_{WM}=D_{EU}$, as described above. Accordingly, as a result of the position adjustment described above, the light-emission center 4000 substantially coincides with the incident center 3520 in the direction perpendicular to the element-integration surface 2202 (in Z-axis direction). As a result, determined are the relative positions of the light source unit 23 and the slider 22 in the direction perpendicular to the element-integration surface 2202 (in X-axis direction).

Here, the acceptable range of the distance $E_{US1}$ is a range including an alignment error, even with which the sufficient amount of light for heat assist, emitted from the light source unit, enters the waveguide 35 from the end surface 352 when alignment in Y-axis direction is accomplished. While the alignment can be accomplished by using a single marker 42, by using at least two markers 42 to align with the edge 4001 as in the present embodiment, alignment of the light source unit 23 with the slider 22 in the rotation direction about the X-axis can be accomplished at the same time.

Then, the light source marker 43 and the marker 42 are used to perform alignment in the track width direction (in Y-axis direction). A method for positioning the light source marker 43 and the marker 42 in the track width direction (in Y-axis direction) will be described below. Referring to FIG. 6c, the distance from the light-emission center 4000 in the light source unit 23 to the edge 431 of the light source marker 43 on the light-emission center 4000 side in the track width direction (in Y-axis direction) is denoted by $D_{CU}$. On the other hand, the distance from the incident center 3520 in the slider 22 to the edge 4201 of the marker 42 on the incident center 3520 side is denoted by $D_{CS}$. Here, the distances are set to be substantially equal, that is $D_{CU}=D_{CS}$.

The following is the explanation of alignment in the track width direction (in Y-axis direction) between the light source unit 23 and the slider 22 that have the light source marker 43 and the marker 42 set as described above, respectively, and have been already aligned with each other in Z-axis direction as shown in FIG. 6d. The light source unit 23 is moved, as shown in FIG. 6d, along the track width direction (along Y-axis direction) indicated by arrow 64 to adjust the position of the light source unit 23 so that, as shown in FIG. 6e, the edge 431 of the light source marker 43 coincides with the edge 4201 of the marker 42, or the edge 431 is at a distance $E_{US2}$ from the edge 4201 within a acceptable range. During the movement, the edge 4200 of the marker 42 is kept coincident with the edge 4001 of the laser diode 40 or at a distance $E_{US1}$ from the edge 4001 within an acceptable range. By this adjustment, the light-emission center 4000 substantially coincides with the incident center 3520 not only in Z-axis direction but also in Y-axis direction because the distance $D_{CU}$ is substantially equal to the distance $D_{CS}$ as noted above. As a result, the relative positions of the light source unit 23 and the slider 22 in Y-Z plane are determined and the alignment between the light source unit 23 and the slider 22 is completed.

In FIG. 6c, the alignment between the light source unit 23 and the slider 22 in Y-axis direction can also be accomplished by making the edge of the light source marker 43 on the opposite side to the light-emission center 4000 coincide with the edge of the marker 42 on the opposite side to the incident center 3520, under the condition that the distance $D_{CU}$ from the light-emission center 4000 to the edge of the light source marker 43 on the opposite side to the light-emission center 4000 is substantially equal to the distance $D_{CS}$ from the incident center 3520 to the edge of the marker 42 on the opposite side to the incident center 3520, that is, substantially $D_{CU}=D_{CS}$. Alternatively, the alignment in Y-axis direction can be made possible by making the distances from the light-emission center 4000 to the edge 431 of the light source marker 43 and to the opposite edge equal to the distances from the incident center 3520 to the edge 4201 of the marker 42 and to the opposite edge, respectively. In this case, in Y-axis direction, the edge 431 is aligned with the edge 4201 and at the same time the opposite edges are aligned with each other.

Finally, ultraviolet (UV) radiation is applied to the light source unit 23 and the slider 22 that are positioned relatively to each other as shown in FIG. 6e, thereby fixing the slider 22 and the light source unit 23 to each other. With this, fabrication of the heat-assisted magnetic recording head 21 is completed.

In the above-described manufacturing method of the heat-assisted magnetic recording head according to the present invention, the light source unit and the slider can be joined to each other with a sufficiently high alignment accuracy. In particular, accurate alignment can be reliably achieved without directly observing the light-emission center 4000 and the incident center 3520, which are difficult to locate during the alignment. Consequently, the alignment operation is facilitated and the manufacturing yield of the head can be improved.

FIGS. 7a to 7c show schematic views for explaining another embodiment of alignment in the direction perpendicular to the element-integration surface (in Z-axis direction) in the steps of joining a light source unit 23 to a slider 22. Further, FIGS. 8a and 8b show graphs schematically illustrating exemplary profiles of outputs from a laser displacement meter used for alignment.

Referring to FIG. 7a, a sloping portion 71 is provided in the head-part end surface 2211' of a slider 22'. The slope 710 of the sloping portion 71 reaches the upper surface 2212' of the head part 221' and has an edge 7100 extending in the track width direction (in Y-axis direction) on the element-integration surface 2202' side. A marker 70 is provided on the head-part end surface 2211' in such a manner that the edge 700 of the marker 70 on the opposite side to the element-integration surface 2202' is on the edge 7100 of the sloping portion 71. In the slider 22', the distance $D_{WS}$ from the incident center 3520' to the edge 7100 of the sloping portion 71 is set to be substantially equal to the distance $D_{EU}$ from the light-emission center 4000 of a laser diode 40 to the upper surface 403 of the laser diode 40, that is $D_{WS}=D_{EU}$. A method for forming the sloping portion 71 will be described later with reference to FIG. 10b.

The head-part end surface 2211' and the back surface 2201' of the slider 22' having the structure described above is brought into a surface contact with the joining surface 2300 of a light source unit 23, and then, the light unit 23 is moved in an appropriate direction, for example in the direction indicated by arrow 74 (in Z-axis direction). During the movement, at least one (two in the present embodiment) laser displacement meter 72 is used as displacement measuring means to apply laser light 73 to the end surface 2212' of the head part 221' and to the upper surface 403 of the laser diode 40. The laser displacement meter 72 measures the distance to objects under measurement (the surface of the slider 22 and the surface of the light source unit 23), on the basis of the triangulation method with the amount of displacement of the convergence point of the reflected light of laser light 73 applied, or by focusing the laser light 73 on the surface of the objects under measurement and using the confocal point. While checking a output profile from the laser displacement meter 72, the light source unit 23 is moved in the direction indicated by arrow 74 (in Z-axis direction), for example, to adjust the position of the light source unit 23 so that the edge 4001 of the laser diode 40 coincides with the edge 7100 of the sloping portion 71, or is at a distance $E_{US3}$ from the edge 7100 within an acceptable range, as shown in FIG. 7b.

A method for checking the relative positions of the light source unit 23 and the slider 22 in the direction perpendicular to the element-integration surface 2202' (in Z-axis direction) using a output profile from the laser displacement meter 72 will be described below.

Referring to FIG. 8a, by using the laser displacement meter 72, an output profile 80 for the positional relation between the light source unit 23 and the slider 22 can be obtained in which the horizontal axis represents locations in X-axis direction and the vertical axis represents displacements in Z-axis direction on each location in X-axis direction. The output profile 80 includes a section 800 corresponding to the upper surface 403 of the laser diode 40 and a section 802 corresponding to the slope 710 of the sloping portion 71. An offset section 801 exists between the sections 800 and 802. The displacement $D_{OFF}$ in the offset section 801 represents a misalignment $D_Z$ between the edge 4001 of the laser diode 40 and the edge 7100 of the sloping portion 71 in Z-axis direction. Accordingly, by moving the light source unit 23 so that an output profile 80' is obtained in which the offset section 801 is eliminated and the sections 801 and 802 are directly joined as shown in FIG. 8b, the edge 4001 and the edge 7100 can be made coincide with each other. Alternatively, by performing adjustment so that the displacement in the offset section 801 in the output profile falls within a predetermined range, the distance $E_{US3}$ between the edge 4001 and the edge 7100 can be confined within an acceptable range.

Here, the distance $D_{WS}$ from the incident center 3520' to the edge 7100 of the sloping portion 71 is set to be substantially equal to the distance $D_{EU}$ from the light-emission center 4000 of the laser diode 40 to the upper surface 403 of the laser diode 40, that is $D_{WS}=D_{EU}$, as described above. Accordingly, as a result of the adjustment described above, the light-emission center 4000 coincides with the incident center 3520 in the direction perpendicular to the element-integration surface 2202 (in Z-axis direction). Consequently, the relative positions of the light source unit 23 and the slider 22 in the direction perpendicular to the element-integration surface 2202 (in the Z-axis direction) is determined.

By using at least two laser displacement meters 72 as in the present embodiment and checking output profiles from the laser displacement meters 72 to perform the adjustment described above, the light source unit 23 can be aligned with the slider 22 in the rotation direction about the X-axis at the same time. Subsequent alignment in the track width direction (in Y-axis direction) can be performed by using the same method with the light source marker 43 and marker 70, described with reference to FIGS. 7b and 7c. The alignment in the track width direction (in Y-axis direction) is made possible by setting the distance from the light-emission center 4000 to the edge of the light source marker 43 on the light-emission center 4000 side in the track width direction (in the Y-axis direction) to be substantially equal to the distance from the incident center 3520 to the edge of the marker 70 on the incident center 3520 side.

Instead of the sloping portion 71 in FIG. 7a, a step 75 may be provided in the slider's head-part end surface 2211" including the incident center 3520", as shown in FIG. 7c. The wall surface 750 of the step 75 has an edge 7500 on the element-integration surface 2202" side at the boundary to the head-part end surface 2211". The distance $D_{WS}"$ from the incident center 3520" to the edge 7500 of the step 75 is set to be substantially equal to the distance $D_{EU}$ from the light-emission center 4000 of the laser diode 40 to the upper surface 403 of the laser diode 40, that is $D_{WS}"=D_{EU}$. It is understood that such a slider and the light source unit 23 can also be aligned with each other in the track width direction (in Y-axis direction) by using at least one laser displacement meter and making the edge 7500 of the step 75 coincide with the edge 4001 of the laser diode 40.

It is understood that another embodiment of the method for manufacturing the heat-assisted magnetic recording head according to the present invention enables the light source unit and the slider to be joined to each other with a sufficiently high alignment accuracy. In particular, accurate alignment can be reliably accomplished without directly observing the light-emission center 4000 and the incident center 3520, which are difficult to locate during the alignment. Consequently, the alignment operation is facilitated and the manufacturing yield of the head can be improved. The resolution of displacement in an output profile from the laser displacement meter 72 is, for example, 0.1 μm or less, and therefore alignment with a very high accuracy can be accomplished.

FIGS. 9a to 9g show perspective views for explaining one embodiment of the steps of fabricating a waveguide 35 and a near-field light generating element 36.

Figure 9A:
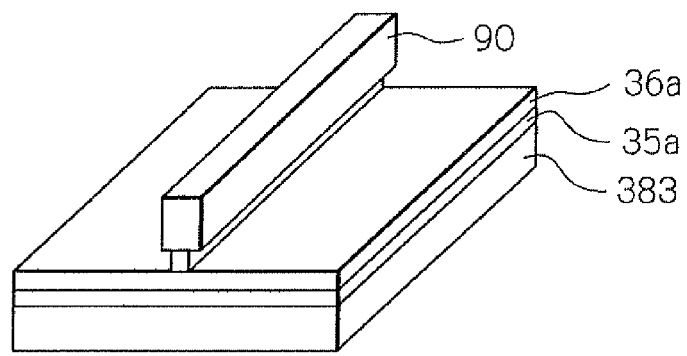
FIGS. 9a to 9g show perspective views for explaining one embodiment of the steps of fabricating a waveguide and a near-field light generating element.
Figure 9B:
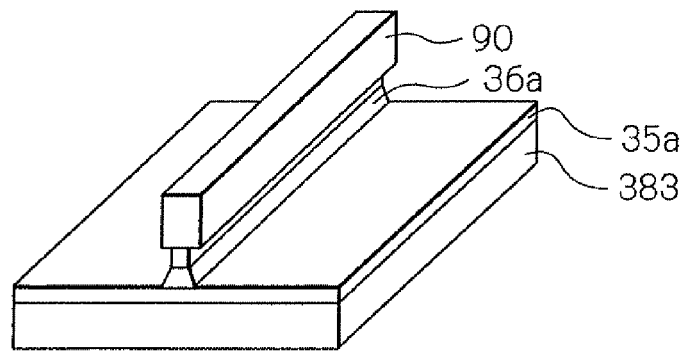
Figure 9C:
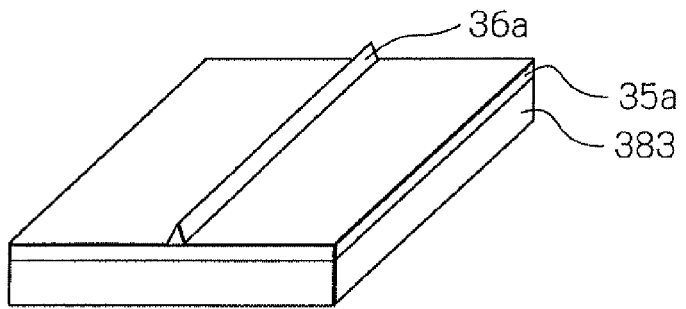

First, on an insulating layer 383 made of a material such as Al$_2$O$_3$, a dielectric film 35a, which will constitute a portion of the waveguide, is formed of a material such as Ta$_2$O$_5$ having a refractive index higher than the insulating layer 383. And a metal layer 36a made of a material such as Au is formed on the dielectric film 35a, and a lift-off resist pattern 90 having a recessed bottom is formed on the metal layer 36a, as shown in FIG. 9a. Then, as shown in FIG. 9b, an unnecessary portion of the metal layer 36a except directly beneath the resist pattern 90 is removed by using a method such as ion milling to form a pattern of the metal layer 36a having a trapezoidal cross-section with a wider base on the dielectric film 35a. Then, as shown in FIG. 9c, the resist pattern 90 is removed, then each sloping surface of the metal layer 36a having the trapezoidal cross-section is partially removed by ion milling to form a metal layer 36a with a triangular cross-section.

Figure 9D:
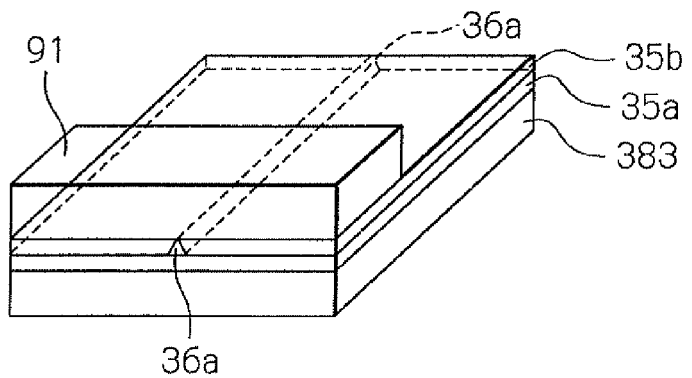
Figure 9E:
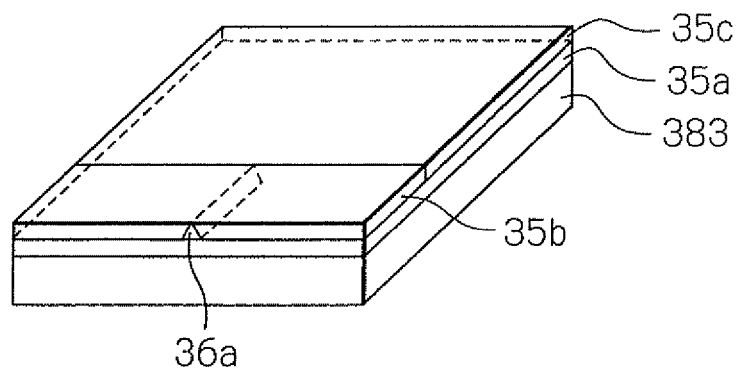

Then, as shown in FIG. 9d, a dielectric film 35b made of the same material as the dielectric film 35a is formed on the dielectric film 35a to cover the metal layer 36a. A resist pattern 91 is then formed on the side on which an opposed-to-medium surface is to be formed, for forming an end surface of the metal layer 36a. Then, a portion of the metal layer 36a and the dielectric film 35b is removed by ion milling, and a dielectric film 35c made of the same material as the dielectric film 35b is formed in that portion.

Figure 9F:
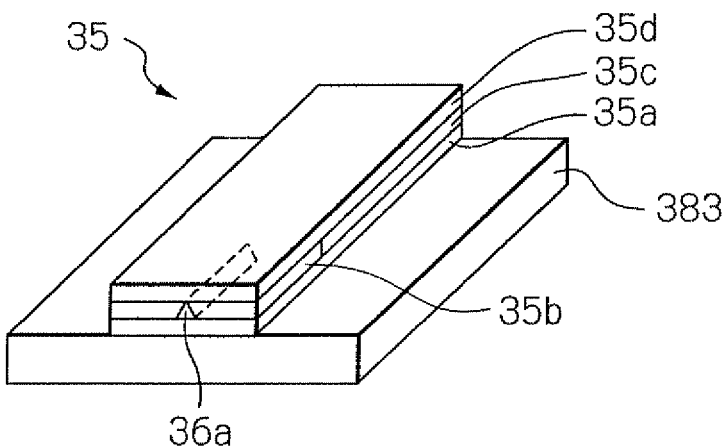

As shown in FIG. 9f, an additional dielectric film 35d made of the same material as the dielectric film 35b is formed on the dielectric films 35b and 35c and the dielectric films 35a, 35b, 35c, and 35d are patterned to a predetermined width to form a waveguide 35.

Figure 9G:
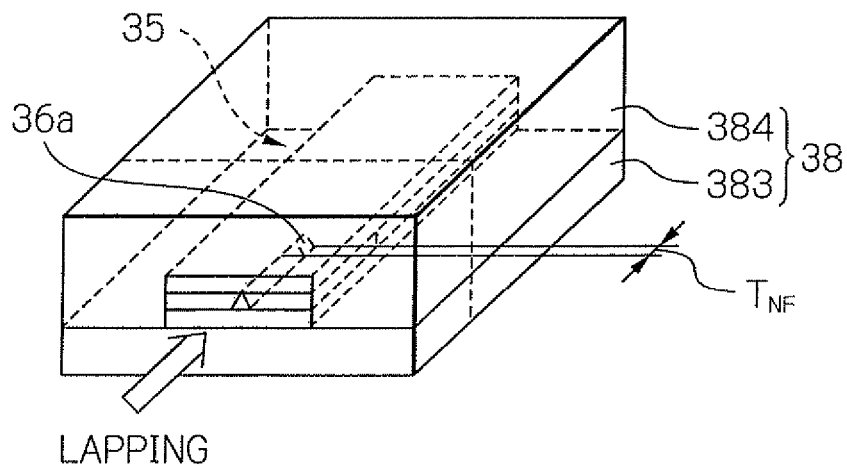

Then, as shown in FIG. 9g, an insulating layer 384 made of the same material as the insulating layer 38a is formed to cover the waveguide 35. With this, completed is an insulating layer 38 serving as a clad. Then, polishing is performed as MR height processing in the machining process of the head manufacturing to form a near-field light generating element 36 having a predetermined thickness T$_{NF}$.

FIGS. 10a to 10f show schematic views illustrating a part of process of one embodiment of the method for manufacturing the slider 22. The embodiment is designed for fabricating the slider 22 having a sloping portion 71 shown in FIG. 7a.

Figure 10A:
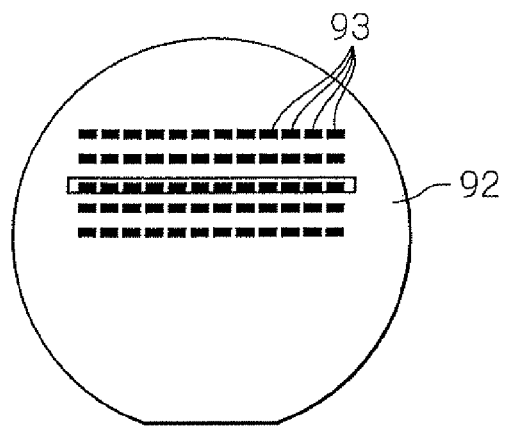
FIGS. 10a to 10f show schematic views illustrating a part of process of one embodiment of the method for manufacturing the slider.

Referring to FIG. 10a, an MR element 33 is formed, by using a well-known method, on the element-integration surface of a wafer substrate 92 which will constitute the slider substrate 220, then a waveguide 35 and a near-field light generating element 36 are formed as shown in FIGS. 9a to 9g, for example. Then, an electromagnetic transducer 34 is formed by using a well-known method, and then an overcoat layer 38 and terminal electrodes 370 and 371 are formed by using a well-known method. With this, completed is a wafer thin-film formation process for forming a head element pattern 93 including the head element 32, the waveguide 35, the near-field light generating element 36, and the terminal electrodes 370 and 371.

Figure 10B:
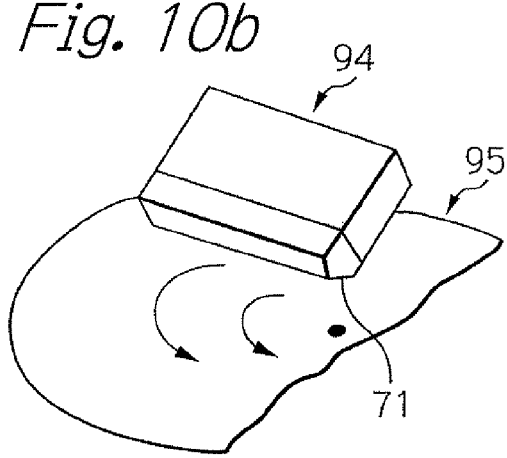
Figure 10C:
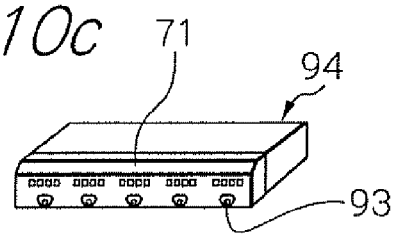

Following the wafer thin-film formation process, the wafer substrate 92 is adhered to a dicing frame by using an adhesive such as a resin and is cut into slider row bars 94, each of which has a row of multiple head element patterns 93 formed thereon. Then, as shown in FIG. 10b, the edge of the head-part end surface of the cut slider bar 94 on the opposite side to the ABS is polished by pressing the edge against polishing means 95 such as a rotating grinding wheel at a predetermined angle to form a sloping portion 71 in the slider bar 94 as shown in FIG. 10c. A marker 70 can be provided beforehand for example as shown in FIG. 7a and the polishing can be performed until the edge 7100 of the sloping portion 71 coincides with the edge 700 of the marker 70 to form a sloping portion 71 having a desired distance D$_{WS}$ (FIG. 7a).

Figure 10D:
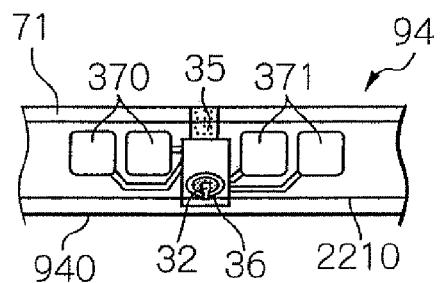

The slider bar 94 in which the sloping portion 71 has been formed is attached to a polishing jig with an adhesive such as a resin, and polishing is applied to the end surface 940 of the slider bar 94 on the ABS side as MR height processing that determines the MR height of the MR multilayer 332, that is, the length of the MR multilayer 332 in the direction perpendicular to the ABS, as shown in FIG. 10d. The MR height processing is performed until the head element 32 and the near-field light generating element 36 are exposed in the head-part end surface 2210, and then the MR multilayer 332 is reduced to a predetermined MR height, and the near-field light generating element 36 is thinned to a predetermined thickness T$_{NF}$ (FIG. 3b).

Figure 10E:
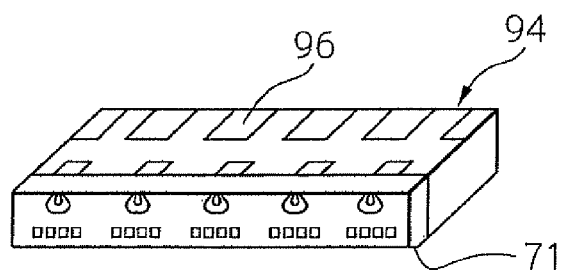
Figure 10F:
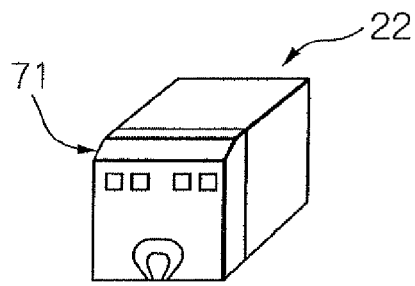

Following the MR height processing, the slider bar 94 is adhered to a rail formation jig with an adhesive such as a resin, and a process for forming rails 96 on the ABS as shown in FIG. 10e is performed. With this, the process for fabricating the slider bar 94 ends. Then, the slider bar 94 is cut to be separated into individual sliders 22 as shown in FIG. 10f. With this, the machining process ends and the process for fabricating sliders 22 is completed.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A manufacturing method of a heat-assisted magnetic recording head in which a light source unit including: a unit substrate having a joining surface; and a light source which is provided on a source-installation surface of said unit substrate and whose surface including an light-emission center is positioned on the joining surface side, is joined to a slider, said slider including:
    a slider substrate having an opposed-to-medium surface; and
    a head part formed on an element-integration surface of said slider substrate, said head part including: a write head element for writing data on a magnetic recording medium; and a waveguide for guiding an incident light to the opposed-to-medium surface side, an end of said waveguide on the opposite side to the opposed-to-medium surface reaching an end surface of said head part on the opposite side to the opposed-to-medium surface, and the end of said waveguide having an incident center;
    the manufacturing method comprising the steps of:
    providing at least one marker on the end surface of said head part on the opposite side to the opposed-to-medium surface, said at least one marker being set so that a distance from said incident center of said waveguide to an end of said at least one marker on the opposite side to the element-integration surface in a direction perpendicular to the element-integration surface is substantially equal to a distance from said light-emission center of said light source to an end surface of said light source on the opposite side to the source-installation surface; and moving said light source unit and said slider relatively to each other while keeping the joining surface of said unit substrate in surface contact with an end surface of said slider substrate on the opposite side to the opposed-to-medium surface, and setting relative positions of said light source unit and said slider in a direction perpendicular to the element-integration surface to be positions in which an end of said at least one marker on the opposite side to the element-integration surface coincides with, or is at a distance within an acceptable range from, an edge of the surface including said light-emission center of said light source.

2. The manufacturing method as claimed in claim 1, wherein said at least one marker is provided on the end surface of said head part on the opposite side to the opposed-to-medium surface so that: a distance from the element-integration surface to an end of said at least one marker on the element-integration surface side is substantially equal to a distance from the element-integration surface to said incident center; and a thickness of said at least one marker in the direction perpendicular to the element-integration surface is substantially equal to a distance from said light-emission center of said light source to the end surface of said light source on the opposite side to the source-installation surface.

3. The manufacturing method as claimed in claim 1, wherein the end surface of said light source on the opposite side to the source-installation surface is an end surface farthest from the source-installation surface.

4. The manufacturing method as claimed in claim 1, further comprising the steps of:
providing at least one light source marker on an end surface of said light source on the opposite side to the source-installation surface, at or near the edge on the joining surface side of the end surface of said light source, said at least one light source marker being set so that a distance from said light-emission center to an end of said at least one light source marker on the light-emission center side and/or on the opposite side to said light-emission center in a track width direction is substantially equal to a distance from said incident center to an end of said at least one marker on the incident center side and/or on the opposite side to said incident center in the track width direction; and moving said light source unit and said slider relatively to each other while keeping the joining surface of said unit substrate in surface contact with an end surface of said slider substrate on the opposite side to the opposed-to-medium surface, and setting relative positions of said light source unit and said slider in the track width direction to be positions in which the end of said at least one light source marker on the light-emission center side and/or on the opposite side to said light-emission center coincides with, or is at a distance within an acceptable range from, the end of said at least one marker on the incident center side and/or on the opposite side to said incident center in the track width direction.

5. A manufacturing method of a heat-assisted magnetic recording head in which a light source unit including: a unit substrate having a joining surface; and a light source which is provided on a source-installation surface of said unit substrate and whose surface including an light-emission center is positioned on the joining surface side, is joined to a slider, said slider including:
a slider substrate having an opposed-to-medium surface; and
a head part formed on an element-integration surface of said slider substrate, said head part including: a write head element for writing data on a magnetic recording medium; and a waveguide for guiding an incident light to the opposed-to-medium surface side, and an end of said waveguide on the opposite side to the opposed-to-medium surface reaching an end surface of said head part on the opposite side to the opposed-to-medium surface, the end of said waveguide having an incident center;
the manufacturing method comprising the steps of:
providing a step or a sloping portion in the end surface of said head part on the opposite side to the opposed-to-medium surface, said step or said sloping portion being set so that a distance from said incident center of said waveguide to an edge of said step or said sloping portion on the element-integration surface side is substantially equal to a distance from said light-emission center of said light source to an end surface of said light source on the opposite side to the source-installation surface; and
moving said light source unit and said slider relatively to each other while keeping the joining surface of said unit substrate in surface contact with an end surface of said slider substrate on the opposite side to the opposed-to-medium surface, and setting relative positions of said light source unit and said slider in a direction perpendicular to the element-integration surface to be positions in which the edge of said step or said sloping portion on the element-integration surface side coincides with, or is at a distance within an acceptable range from, an edge of the surface including said light-emission center of said light source.

6. The manufacturing method as claimed in claim 5, wherein the end surface of said light source on the opposite side to the source-installation surface is an end surface farthest from the source-installation surface.

7. The manufacturing method as claimed in claim 5, wherein at least one displacement measuring means is used to determine relative positions of said light source unit and said slider in a direction perpendicular to the element-integration surface.

8. The manufacturing method as claimed in claim 7, wherein: said at least one displacement measuring means is at least one laser displacement meter; said at least one laser displacement meter is used to apply laser light to the end surface of said head part on the opposite side to the element-integration surface and the end surface of said light source on the opposite side to the source-installation surface, to obtain a profile of a displacement in the direction perpendicular to the element-integration surface; and the profile is used to determine the relative positions.

9. The manufacturing method as claimed in claim 5, further comprising the steps of:
providing at least one marker on the end surface of said head part on the opposite side to the opposed-to-medium surface, said at least one marker being set so that the end of said at least one marker on the opposite side to the element-integration surface is positioned on the edge of said step or said sloping portion on the element-integration surface side;

providing at least one light source marker on the end surface of said light source on the opposite side to the source-installation surface, at a position where its end reaches the edge of the end surface on the joining surface side of said light source or near said edge of said end surface, the marker being set so that a distance from said light-emission center to an end of said at least one light source marker on the light-emission center side and/or on the opposite side to said light-emission center in the track width direction is substantially equal to a distance from said incident center to an end of said at least one marker on the incident center side and/or on the opposite side to said incident center; and moving said light source unit and said slider relatively to each other while keeping the joining surface of said unit substrate in surface contact with an end surface of said slider substrate on the opposite side to the opposed-to-medium surface, and setting relative positions of said light source unit and said slider in the track width direction to be positions in which the end of said at least one light source marker on the light-emission center side and/or on the opposite side to said light-emission center coincides with, or is at a distance within an acceptable range from, the end of said at least one marker on the incident center side and/or on the opposite side to said incident center in the track width.

10. A slider for heat-assisted magnetic recording, said slider constituting a heat-assisted magnetic recording head by joining a light source unit including a light source provided on a source-installation surface of a unit substrate having a joining surface to an end surface of said slider on the opposite side to an opposed-to-medium surface of said slider, said slider comprising:

a slider substrate having the opposed-to-medium surface; and a head part formed on an element-integration surface of said slider substrate, said head part including: a write head element for writing data on a magnetic recording medium; and a waveguide for guiding an incident light to the opposed-to-medium surface side, an end of said waveguide on the opposite side to the opposed-to-medium surface having an incident center;

a step or a sloping portion being provided on an end surface of said head part on the opposite side to the opposed-to-medium surface, and a distance from said incident center of said waveguide to an edge of said step or sloping portion on the element-integration surface side being substantially equal to a distance from said light-emission center of said light source to an end surface of said light source on the opposite side to the source-installation surface.

11. The slider as claimed in claim 10, wherein the end surface of said light source on the opposite side to the source-installation surface is an end surface farthest from the source-installation surface.

12. The slider as claimed in claim 10, wherein at least one marker is provided on the end surface of said head part on the opposite side to the opposed-to-medium surface, and an end of said at least one marker on the opposite side to the element-integration surface is positioned on the edge of said step or sloping portion on the element-integration surface side.

13. The slider as claimed in claim 12, wherein said at least one marker is an end surface of a marker layer appearing in the end surface of said head part on the opposite side to the opposed-to-medium surface, said marker layer provided in said head part.

14. A heat-assisted magnetic recording head constituted by joining a light source unit to a slider as claimed in claim 10, wherein at least one marker is provided on an end surface of said head part of said slider on the opposite side to the opposed-to-medium surface, and an end of said at least one marker on the opposite side to the element-integration surface is positioned on an edge of said step or sloping portion on the element-integration surface side;

said light source unit includes a unit substrate having a joining surface and a light source provided on a source-installation surface of said unit substrate; and at least one light source marker is provided on an end surface of said light source on the opposite side to the source-installation surface, at a position where its end reaches the edge of the end surface on the joining surface side of said light source or near said edge of said end surface, and a distance, in a track width direction, from said light-emission center to an end of said at least one light source marker on the light-emission center side and/or on the opposite side to said light-emission center is substantially equal to a distance, in the track width direction, from said incident center to an end of said at least one marker on the incident center side and/or on the opposite side to said incident center.

15. The heat-assisted magnetic recording head as claimed in claim 14, wherein the end surface of the light source on the opposite side to the source-installation surface is an end surface farthest from the source-installation surface.

16. The heat-assisted magnetic recording head as claimed to claim 14, wherein said at least one marker is an end surface of a marker layer appearing in the end surface of said head part on the opposite side to the opposed-to-medium surface, said marker layer provided in said head part.

17. A head gimbal assembly comprising a suspension and a heat-assisted magnetic head as claimed in claim 14 attached to said suspension, wherein an end surface of said slider substrate on the opposite side to the opposed-to-medium surface is bonded to said suspension, said suspension includes an opening, and said light source unit protrudes through said opening on the opposite side to said slider in relation to said suspension.

18. A magnetic recording apparatus comprising at least one head gimbal assembly as claimed in claim 17, at least one magnetic recording medium, and a control circuit for controlling read and write operations performed by said heat-assisted magnetic recording head to said at least one magnetic recording medium and for controlling light emission operation of said light source.

* * * * *